(12) United States Patent
Shin

(10) Patent No.: US 11,065,769 B2
(45) Date of Patent: Jul. 20, 2021

(54) ROBOT, METHOD FOR OPERATING THE SAME, AND SERVER CONNECTED THERETO

(71) Applicant: LG ELECTRONICS INC., Seoul (KR)

(72) Inventor: Yong Kyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 16/566,145

(22) Filed: Sep. 10, 2019

(65) Prior Publication Data

US 2020/0086491 A1  Mar. 19, 2020

(30) Foreign Application Priority Data

Sep. 14, 2018  (KR) .................. 10-2018-0110503

(51) Int. Cl.
| | |
|---|---|
| H04N 7/14 | (2006.01) |
| B25J 9/16 | (2006.01) |
| B25J 11/00 | (2006.01) |
| G06T 7/20 | (2017.01) |
| H04L 12/58 | (2006.01) |
| H04N 7/15 | (2006.01) |

(52) U.S. Cl.
CPC .......... *B25J 9/1697* (2013.01); *B25J 11/0005* (2013.01); *G06T 7/20* (2013.01); *H04L 51/10* (2013.01); *H04N 7/147* (2013.01); *H04N 7/15* (2013.01); *G06T 2207/10016* (2013.01)

(58) Field of Classification Search
CPC ..... H04L 51/10; B25J 9/1697; B25J 11/0005; B25J 11/0015; G06T 7/20; G06T 2207/10016; H04N 7/142; H04N 7/147; H04N 7/15

USPC ............................ 382/103; 348/14.01–14.16
See application file for complete search history.

(56) References Cited

U.S. PATENT DOCUMENTS

| | | | | |
|---|---|---|---|---|
| 7,123,285 | B2 * | 10/2006 | Smith ................ | A47B 21/0073 348/14.05 |
| 2009/0271038 | A1 | 10/2009 | Song et al. | |
| 2015/0288923 | A1 | 10/2015 | Kim et al. | |
| 2015/0381534 | A1 | 12/2015 | Morris et al. | |
| 2016/0379107 | A1 * | 12/2016 | Li ...................... | B25J 11/0005 706/11 |

(Continued)

FOREIGN PATENT DOCUMENTS

| | | |
|---|---|---|
| JP | 2006-192548 | 7/2006 |
| KR | 10-2009-0113084 | 10/2009 |

(Continued)

OTHER PUBLICATIONS

Korean Office Action dated Sep. 20, 2019 issued in Application No. 10-2018-0110503.

(Continued)

*Primary Examiner* — Melur Ramakrishnaiah
(74) *Attorney, Agent, or Firm* — KED & Associates LLP

(57) ABSTRACT

A method of operating a robot includes detecting movement of a video call counterpart using a video call counterpart robot included in image data received from the video call counterpart robot; canceling movement of a user from detected movement of the video call counterpart; and determining motion corresponding to the canceled movement of the video call counterpart.

20 Claims, 17 Drawing Sheets

(56) References Cited

U.S. PATENT DOCUMENTS

2017/0134694 A1   5/2017   Cho et al.
2018/0089880 A1   3/2018   Garrido
2018/0376073 A1*  12/2018  Shi .................... H04N 5/23299

FOREIGN PATENT DOCUMENTS

KR   10-2010-0008439   1/2010
KR   10-2011-0116380   3/2021

OTHER PUBLICATIONS

Extended European Search Report dated Feb. 14, 2020 issued in Application 19197262.9.
Korean Notice of Allowance dated Mar. 2, 2020 issued in Application 10-2018-0110503.

* cited by examiner

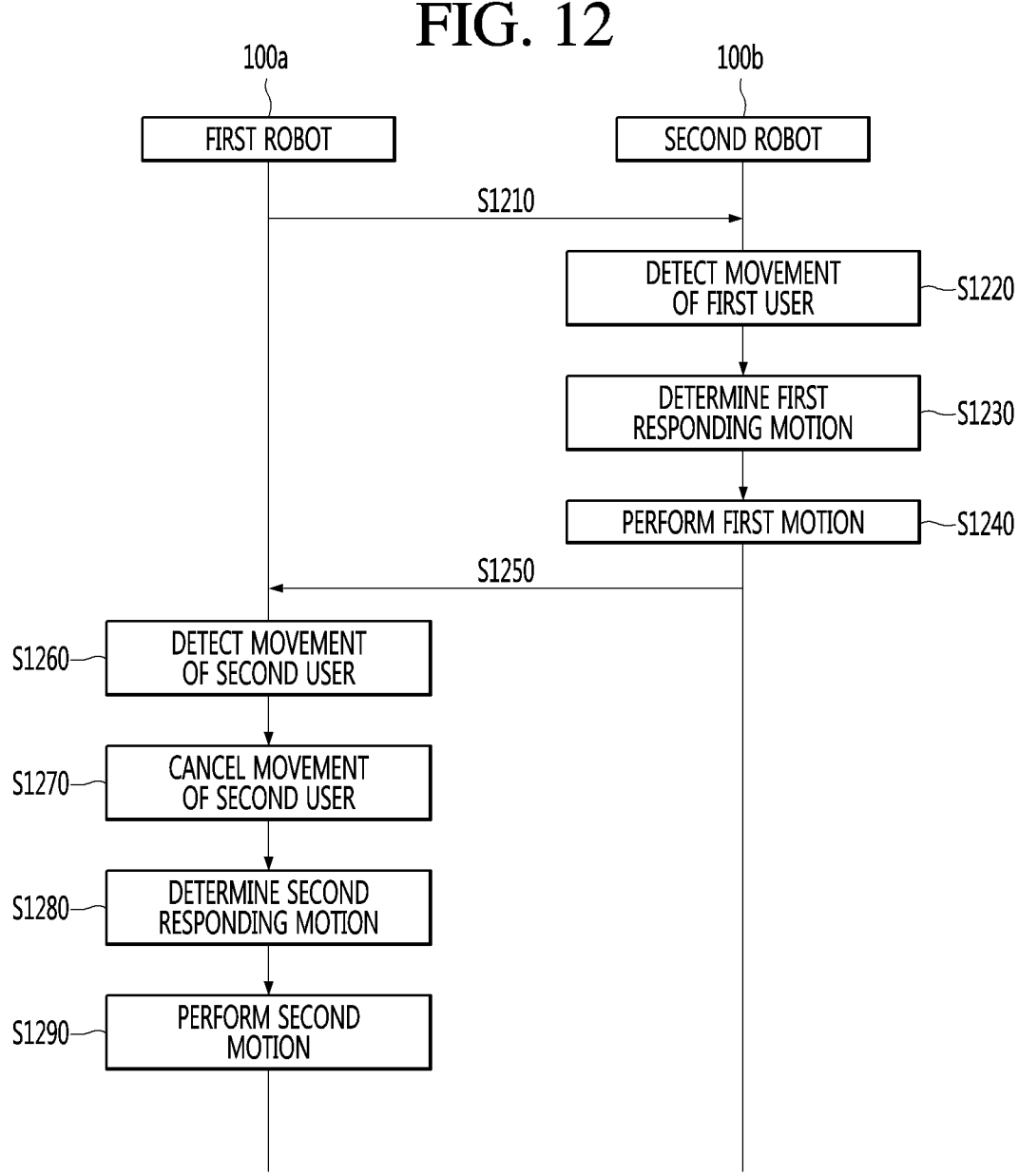

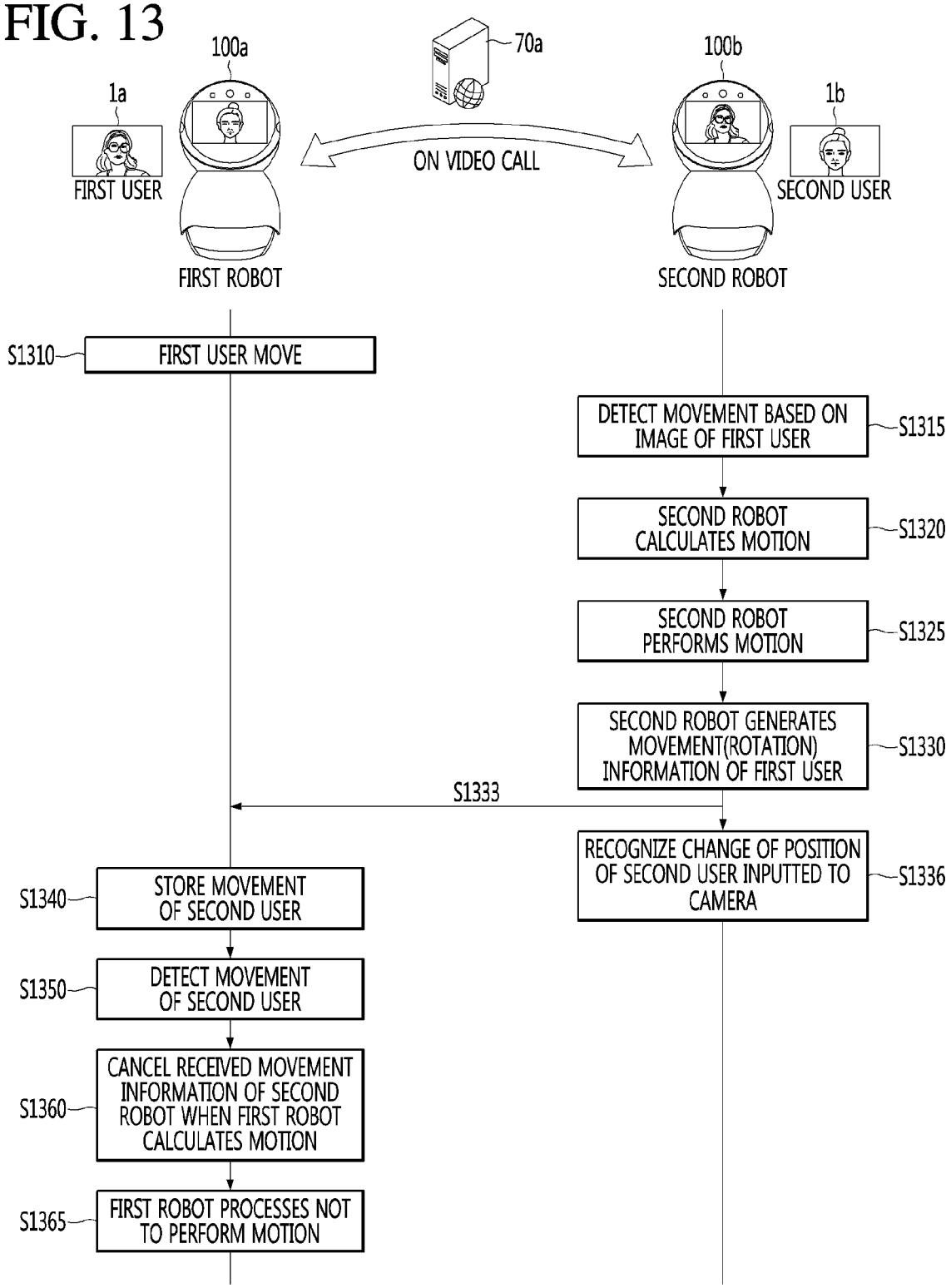

ROBOT, METHOD FOR OPERATING THE SAME, AND SERVER CONNECTED THERETO

CROSS-REFERENCE TO RELATED APPLICATION

The present application claims priority under 35 U.S.C. 119 and 35 U.S.C. 365 to Korean Patent Application No. 10-2018-0110503 (filed Sep. 14, 2018), which is hereby incorporated by reference in its entirety.

BACKGROUND

1. Field

The present disclosure relates to a robot, a method for operating the same, and a server connected thereto, and more particularly, to a robot capable of providing a video call service, an operation method thereof, and a server connected thereto.

2. BACKGROUND

Robots have been developed for industrial use and have been part of factory automation. As the application field of robots has further expanded, medical robots, aerospace robots, and the like have been developed, and household robots that can be used in ordinary homes have been manufactured.

As use of robots has been increased, there is a growing demand for robots that can provide various information, fun, and services while understanding and communicating with users beyond performing simple functions.

Interesting and unusual emoticons, and characters may be increasingly used in social network services, text messages, video calls, and the like. Additionally, beyond the use of pre-manufactured characters, people may create and use their own emoticons and avatars to represent themselves.

For example, a user may create and use a unique character using his/her face, and/or the like. U.S. Patent Application Publication No. 2018/089880A1 (hereafter Document 1), the subject matter of which is incorporated herein by reference, may describe that facial characteristics of a photographed user may be identified, and avatar data corresponding to the identified characteristics may be generated and transmitted.

Additionally, U.S. Patent Application Publication No. 2015/381534A1 (hereafter Document 2), the subject matter of which is incorporated herein by reference, may describe that a self-portrait which can represent user's feeling may be selected in a set of self-portraits when sending an electronic message, and may be transmitted as a file.

However, these documents may be limited to transmission of an image file, and there may be a limit to satisfying demands of people's emotional expression and emotional transmission.

Various schemes for increasing usability of a user by using a plurality of robots may have been studied.

BRIEF DESCRIPTION OF THE DRAWINGS

Arrangements and embodiments may be described in detail with reference to the following drawings in which like reference numerals refer to like elements wherein:

FIG. 12 is a flowchart illustrating a method of operating a robot and a robot system (including the robot) according to an example embodiment of the present invention;

FIG. 13 is a flowchart illustrating a method of operating a robot and a robot system (including the robot) according to an example embodiment of the present invention;

DETAILED DESCRIPTION

Exemplary embodiments of the present invention may be described with reference to the accompanying drawings in detail. The same reference numbers may be used throughout the drawings to refer to the same or like parts. Detailed descriptions of well-known functions and structures incorporated herein may be omitted to avoid obscuring the subject matter of the present invention.

The suffixes "module" and "unit" in elements used in description below are given only in consideration of ease in preparation of the specification and do not have specific meanings or functions. Therefore, the suffixes "module" and "unit" may be used interchangeably.

Figure 1:
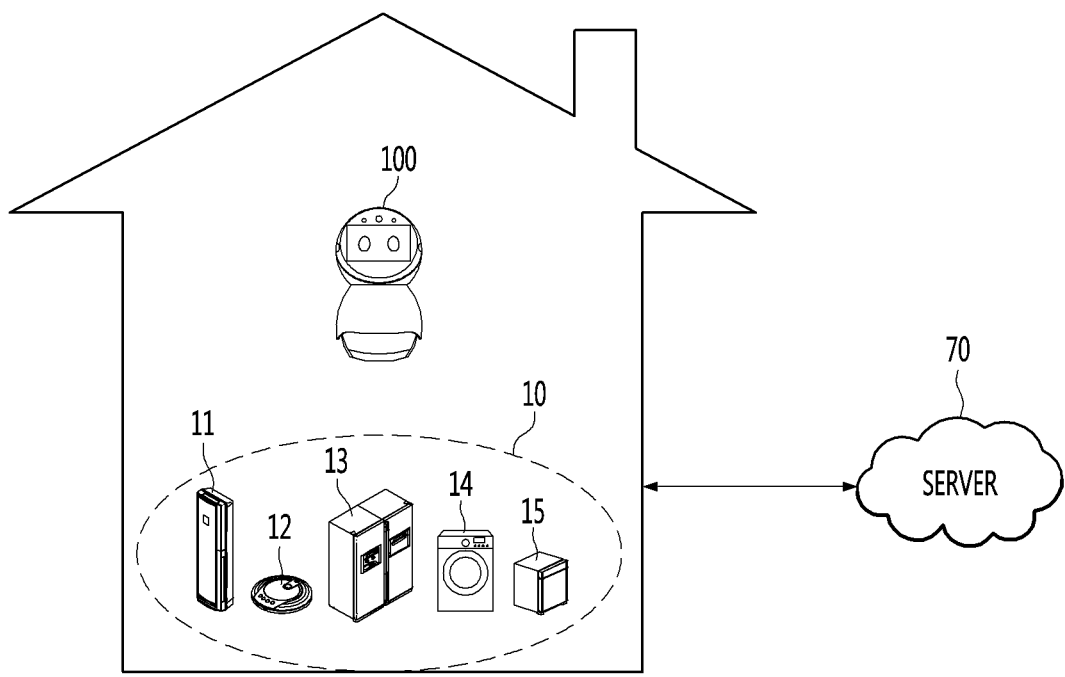
FIG. 1 is a block diagram of a robot system that includes a robot according to an embodiment of the present invention.

FIG. 1 is a block diagram of a robot system that includes a robot according to an embodiment of the present invention.

Referring to FIG. 1, the robot system may include at least one robot 100, and a home appliance 10 that has a communication module to communicate with other apparatuses, the robot 100, a server 70, and the like, and/or to be connected to a network.

For example, the home appliance 10 may include an air conditioner 11 having a communication module, a robot cleaner 12, a refrigerator 13, a washing machine 14, a cooking appliance 15, and the like.

The communication module included in the home appliance 10 may be a wi-fi communication module, but embodiments are not limited to the communication method.

Alternatively, the home appliance 10 may include other types of communication modules or a plurality of communication modules. For example, the home appliance 10 may include an NFC module, a zigbee communication module, a Bluetooth communication module, and/or the like.

The home appliance 10 can be connected to a server 70 through the wi-fi communication module or the like, and can support smart functions such as remote monitoring, remote control, and the like.

The robot system may include a portable terminal such as a smart phone, a tablet PC, and the like.

The user may check information on the home appliance 10 in a robot system or control the home appliance 10 through the portable terminal.

It may be inconvenient for a user to use the portable terminal even all the time, even when the user desires to control the home appliance 10 or check certain information in the home.

For example, it may be more efficient to have a means to control the home appliance 10 in other ways when the user does not know a current location of the portable terminal or when the portable terminal is in another place.

The robot 100 may receive a user's speech input and thus control the home appliance 10 directly or control the home appliance 10 via the server 70.

Accordingly, the user may control the home appliance 10 without operating any other apparatus excluding the robot 100 disposed in the room, living room, or the like.

The robot system may include a plurality of Internet of Things (IoT) apparatuses. Accordingly, the robot system may include the home appliance 10, the robot 100, and the Internet of Things (IoT) apparatuses.

The robot system is not limited to a communication method constituting a network.

For example, the home appliance 10, the robot 100, and the Internet of Things (IoT) apparatuses may be communicatively connected through a wired/wireless router.

Additionally, the apparatuses in the robot system may be configured in a mesh topology that is individually communicatively connected.

The home appliance 10 in the robot system may communicate with the server 70 or the robot 100 via a wired/wireless router.

The home appliance 10 in the robot system may communicate with the server 70 or the robot 100 by Ethernet.

The robot system may include a network apparatus such as a gateway. Alternatively, at least one of the robots 100 provided in the home may be configured to include the gateway function.

The home appliances 10 included in the robot system may be network-connected directly between apparatuses or via the gateway.

The home appliance 10 may be network-connected to be able to communicate with the server 70 directly or via the gateway.

The gateway may communicate with the server 70 or the mobile terminal by Ethernet.

Additionally, the gateway may communicate with the server 70 or the robot 100 via the wired/wireless router.

The home appliance 10 may transmit apparatus operation state information, setting value information, and/or the like to the server 70 and/or the gateway.

The user may check information related to the home appliance 10 in the robot system or control the home appliance 10 through the portable terminal or the robot 100.

The server 70 and/or the gateway may transmit a signal for controlling the home appliances 10 to each apparatus in response to a user command input through the robot 100 or a specific event that occurred in the home appliance 10 in the robot system.

The gateway may include output means (or an output device) such as a display, an sound output unit, and the like.

The display and the sound output unit (or sound output device) may output image and audio stored in the gateway or based on a received signal. For example, a music file stored in the gateway may be played and outputted through the sound output unit.

The display and the sound output unit may output the image and audio information related to operation of the gateway.

The server 70 may store and manage information transmitted from the home appliance 10, the robot 100, and other apparatuses.

The server 70 may be a server operated by a manufacturer of the home appliance or a company entrusted by the manufacturer.

Information related to the home appliance 10 may be transmitted to the robot 100, and the robot 100 may display the information related to the home appliance 10.

The home appliance 10 may receive information or receive a command from the robot 100. The home appliance 10 may transmit various information to the server 70, and the server 70 may transmit part or all of the information received from the home appliance 10 to the robot 100.

The server 70 may transmit information received from the home appliance 10 or may process and transmit the received information to the robot 100.

FIG. 1 illustrates an example of a single server 70, but embodiments are not limited thereto, and the system according to the present invention may operate in association with two or more servers.

For example, the server 70 may include a first server for speech recognition and processing, and a second server for providing a home appliance related service such as a home appliance control.

According to an embodiment, the first server and the second server may be configured by distributing information and functions to a plurality of servers, or may be constituted by a single integrated server.

For example, the first server for speech recognition and processing may be composed of a speech recognition server for recognizing words included in a speech signal and a natural language processing server for recognizing the meaning of a sentence including words included in the speech signal.

Alternatively, the server 70 may include a server for emotion recognition and processing, and a server for providing a home appliance related service, such as a home appliance control. The server for emotion recognition and processing may be configured by distributing information and functions to a plurality of servers, or may be constituted by a single integrated server.

According to an embodiment, the server 70 may include a server for providing a video call service between the robots 100, the robot 100 and a mobile terminal, or the robot 100 and an electronic device.

Figure 2:
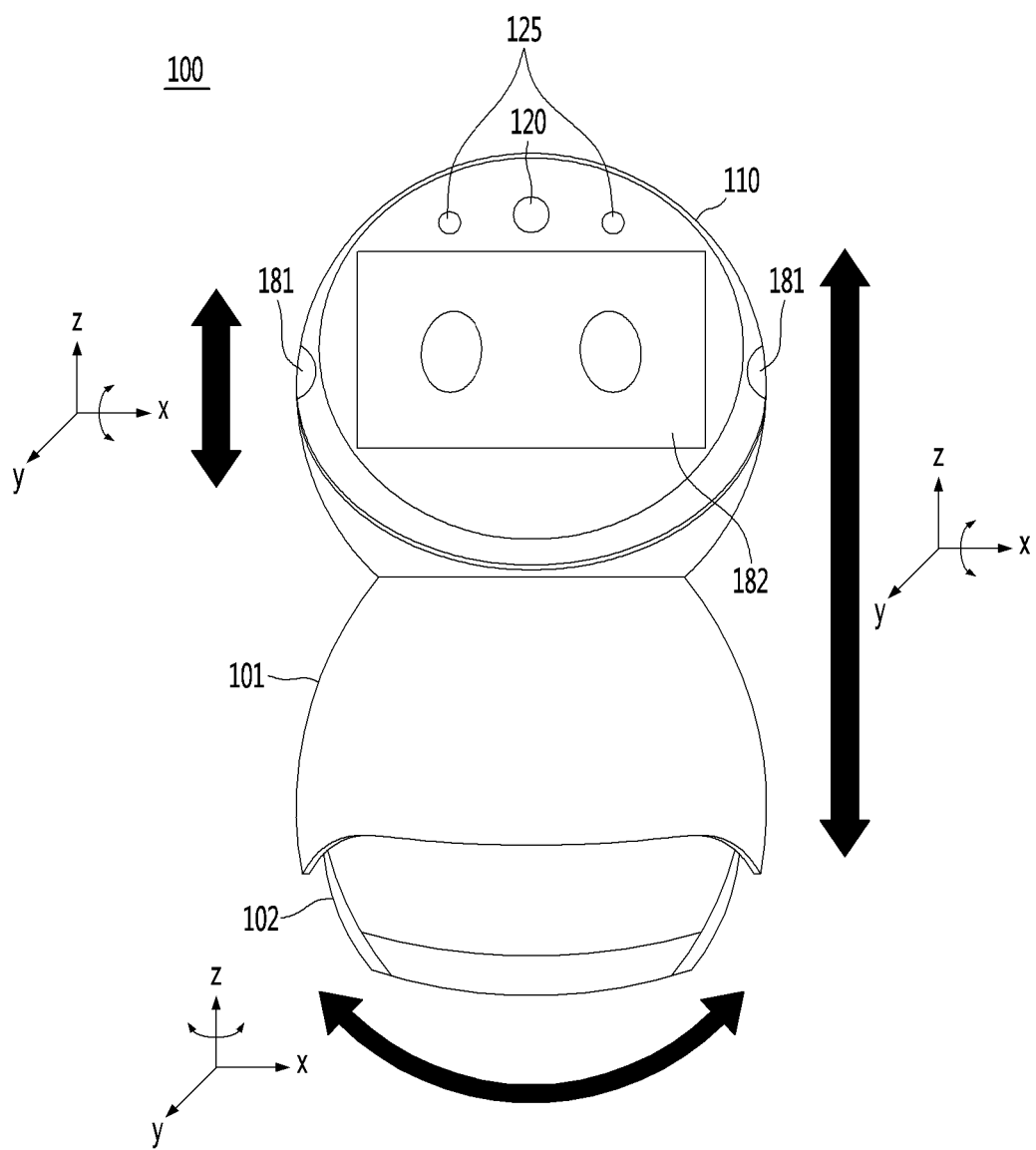
FIG. 2 is a front view showing an outer shape of a robot according to an embodiment of the present invention.
Figure 3:
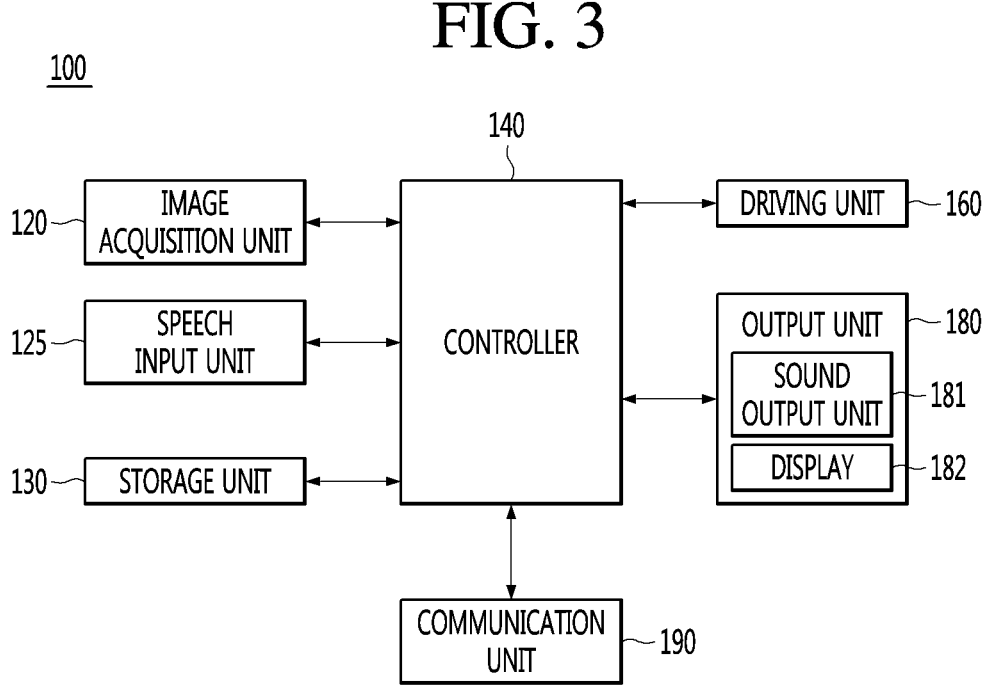
FIG. 3 is an example of an internal block diagram of a robot according to an embodiment of the present invention.

FIG. 2 is a front view showing an outer shape of a robot according to an embodiment of the present invention. FIG. 3 is an example of a internal block diagram of a robot according to an embodiment of the present invention;

Referring to FIGS. 2 and 3, the robot 100 includes a main body that forms an outer shape and houses various components therein.

The main body includes a body 101 forming a space in which various components constituting the robot 100 are accommodated, and a support 102 that is disposed in the lower side of the body 101 and supports the body 101.

The robot 100 may include a head 110 disposed in an upper side of the main body. A display 182 for displaying an image may be disposed on a front surface of the head 110.

In this disclosure, the front direction means the +y axis direction, the up and down direction means the z axis direction, and the left and right direction means the x axis direction.

The head 110 may rotate within a certain angle range about the x-axis.

Accordingly, when viewed from the front, the head 110 can perform a nodding operation that moves in an up and down direction in a similar manner as a person nods his or her head in the up and down direction. For example, the head 110 may perform an original position return operation one or more times after rotating within a certain range in a similar manner as a person nods his/her head in the up and down direction.

At least a part of the front surface on which the display 182 (corresponding to the face of the person in the head 110 is disposed) may be configured to be nodded.

Accordingly, in the present disclosure, an embodiment may allow the entire head 110 to move in the up and down direction. However, unless specifically described, the vertically nodding operation of the head 110 may be replaced with a nodding operation in the up and down direction of at least a part of the front surface on which the display 182 is disposed.

The body 101 may be configured to be rotatable in the left-right direction. That is, the body 101 may be configured to rotate 360 degrees about the z-axis.

The body 101 also may be configured to be rotatable within a certain angle range about the x-axis, so that it can move as if it nods in the up and down direction. In this example, as the body 101 rotates in the up and down direction, the head 110 may also rotate about the axis in which the body 101 rotates.

Accordingly, the operation of nodding the head 110 in the up and down direction may include both the example where the head 110 itself rotates in the up and down direction when viewed from the front based on a certain axis, and the example where when the head 101 connected to the body 101 rotates and is nodded together with the body 101 as the body 101 is nodded in the up and down direction.

The robot 100 may include a power supply unit (or power supply device) which is connected to an outlet in a home and supplies power to the robot 100.

Alternatively, the robot 100 may include a power supply unit provided with a rechargeable battery to supply power to the robot 100. A power supply unit may include a wireless power receiving unit for wirelessly charging the battery.

The robot 100 may include an image acquisition unit 120 (or image acquisition device) that can photograph a certain range around the main body, or at least the front surface of the main body.

The image acquisition unit 120 may photograph surroundings of the main body, the external environment, and/or the like, and may include a camera module. The camera module may include a digital camera. The digital camera may include an image sensor (e.g., a CMOS image sensor) configured to include at least one optical lens, and a plurality of photodiodes (e.g., pixel) that form an image by light that passed through the optical lens, and a digital signal processor (DSP) that forms an image based on a signal outputted from the photodiodes. The digital signal processor may generate a moving image composed of still images as well as still image.

Several cameras may be installed for each part of the robot for photographing efficiency. The image acquisition unit 120 may include a front camera provided in the front surface of the head 110 to acquire an image of the front of the main body. However, the number, disposition, type, and photographing range of the cameras provided in the image acquisition unit 120 are not limited thereto.

The image acquisition unit 120 may photograph in the front direction of the robot 100, and may photograph an image for user recognition.

The image photographed and acquired by the image acquisition unit 120 may be stored in a storage unit 130 (or storage).

The robot 100 may include a speech input unit 125 (or speech input device) for receiving a speech input of a user. The speech input unit may also be an audio input unit.

The speech input unit 125 may include a processor for converting an analog speech into digital data, or may be connected to the processor to convert a speech signal inputted by a user into data to be recognized by the server 70 or a controller 140 (FIG. 3).

The speech input unit 125 may include a plurality of microphones to enhance accuracy of reception of user speech input, and to determine the position of the user.

For example, the speech input unit 125 may include at least two microphones.

The plurality of microphones (MICs) may be disposed at different positions, and may acquire an external audio signal (including a speech signal) to process the audio signal as an electrical signal.

At least two microphones, which are an input device, may be used to estimate the direction of a sound source that generated sound and a user, and the resolution (angle) of the direction detection becomes higher as the distance between the microphones is physically far.

Depending on the embodiment, two microphones may be disposed in the head 110.

The position of the user on a three-dimensional space can be determined by further including two microphones in the rear surface of the head 110.

Referring to FIG. 3, the robot 100 may include the controller 140 for controlling the overall operation, the storage unit 130 (or storage device) for storing various data, and a communication unit 190 (or communication device) for transmitting and receiving data with other apparatuses such as the server 70.

The robot 100 may include a driving unit 160 (or driving device) that rotates the body 101 and the head 110. The driving unit 160 may include a plurality of driving motors for rotating and/or moving the body 101 and the head 110.

The controller 140 may control overall operation of the robot 100 by controlling the image acquisition unit 120, the driving unit 160, the display 182, and the like, which constitute the robot 100.

The storage unit 130 may record various types of information required for controlling the robot 100, and may include a volatile or nonvolatile recording medium. The recording medium may store data that can be read by a microprocessor, and may include a hard disk drive (HDD), a solid state disk (SSD), a silicon disk drive (SDD), a ROM, a RAM, a CD-ROM, a Magnetic tape, a floppy disk, an optical data storage device, and the like.

The controller 140 may transmit an operation state of the robot 100, user input, and/or the like to the server 70, or the like through the communication unit 190.

The communication unit 190 may include at least one communication module so that the robot 100 is connected to the Internet or a certain network.

The communication unit 190 may be connected to the communication module provided in the home appliance 10 and process data transmission/reception between the robot 100 and the home appliance 10.

The storage unit 130 may store data for speech recognition, and the controller 140 may process the speech input signal of the user received through the speech input unit 125 and perform a speech recognition process.

Since various known speech recognition algorithms can be used for the speech recognition process, a detailed description of the speech recognition process may be omitted in this disclosure.

The controller 140 may control the robot 100 to perform a certain operation based on a speech recognition result.

For example, when a command included in the speech signal is a command for controlling operation of a certain home appliance, the controller 140 may control to transmit a control signal based on the command included in the speech signal to a control target home appliance.

When the command included in the speech signal is a command for controlling operation of a certain home appliance, the controller 140 may control the body 101 of the robot to rotate in the direction toward the control target home appliance.

The speech recognition process may be performed in the server 70 without being performed in the robot 100 itself.

The controller 140 may control the communication unit 190 so that the user input speech signal is transmitted to the server 70.

Alternatively, a speech recognition may be performed by the robot 100, and a high-level speech recognition (such as natural language processing) may be performed by the server 70.

For example, when a keyword speech input including a preset keyword is received, the robot may switch from a standby state to an operating state. In this example, the robot 100 may perform only the speech recognition process up to the input of the keyword speech, and the speech recognition for the subsequent user speech input may be performed through the server 70.

Depending on an embodiment, the controller 140 may compare the user image acquired through the image acquisition unit 120 with information stored in the storage unit 130 in order to determine whether the user is a registered user.

The controller 140 may control to perform a specific operation only for the speech input of the registered user.

The controller 140 may control rotation of the body 101 and/or the head 111, based on user image information acquired through the image acquisition unit 120.

Accordingly, interaction and communication between the user and the robot 100 can be easily performed.

The robot 100 may include an output unit 180 (or output device) to display certain information as an image or to output certain information as a sound.

The output unit 180 may include a display 182 for displaying, as an image, information corresponding to a user's command input, a processing result corresponding to the user's command input, an operation mode, an operation state, an error state, and/or the like.

The display 182 may be disposed at the front surface of the head 110 as described above.

The display 182 may be a touch screen having a mutual layer structure with a touch pad. The display 182 may be used as an input device for inputting information by a user's touch as well as an output device.

The output unit 180 may include a sound output unit 181 (or sound output device) for outputting an audio signal. The sound output unit 181 may output, as sound, a notification message (such as a warning sound, an operation mode, an operation state, and an error state, and/or the like), information corresponding to a command input by a user, a processing result corresponding to a command input by the user, and/or the like. The sound output unit 181 may convert an electric signal from the controller 140 into an audio signal and output the signal. For this purpose, a speaker, and/or the like may be provided.

Referring to FIG. 2, the sound output unit 181 may be disposed in the left and right sides of the head 110, and may output certain information as sound.

The outer shape and structure of the robot shown in FIG. 2 are illustrative, and embodiments are not limited thereto. For example, positions and numbers of the speech input unit 125, the image acquisition unit 120, and the sound output unit 181 may vary according to design specifications. Further, rotation direction and angle of each component may also vary. For example, unlike the rotation direction of the robot 100 shown in FIG. 2, the entire robot 100 may be inclined or shaken in a specific direction.

The robot 100 may access to the Internet and a computer by support of a wired or wireless Internet function.

The robot 100 can perform speech and video call functions, and such a call function may be performed by using an Internet network, a mobile communication network, and/or the like according to Speech over Internet Protocol (VoIP).

When performing the video call function, the robot 100 may access a server for providing a video call service through the Internet network or the mobile communication network.

The controller 140 may control the display 182 to display the image of a video call counterpart and an image of the user in a video call according to the setting of the user, and control the sound output unit 181 to output a speech (or audio) based on the received speech signal of the video call counterpart.

A robot system according to an example embodiment may include two or more robots that perform a video call.

Figure 4:
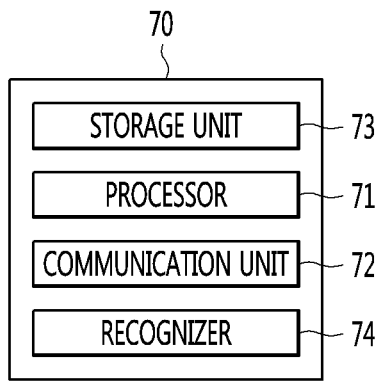
FIG. 4 is an example of an internal block diagram of a server according to an embodiment of the present invention.

FIG. 4 is an example of an internal block diagram of a server according to an embodiment of the present invention.

Referring to FIG. 4, the server 70 may include a communication unit 72 (or communication device), a storage unit 73 (or storage device), a recognizer 74, and a processor 71.

The processor 71 may control overall operation of the server 70.

The server 70 may be a server operated by manufacturer of a home appliance such as the robot 100 or a server operated by a service provider, or may be a kind of a cloud server.

The communication unit 72 may receive various data such as state information, operation information, handling information, and the like from a portable terminal, a home appliance such as the robot 100, a gateway, and the like.

The communication unit 72 can transmit data corresponding to the received various information to the portable appliance, the home appliance (such as the robot 100), the gateway, and the like.

The communication unit 72 may include one or more communication modules such as an Internet module, a mobile communication module, and the like.

The storage unit 73 may store the received information, and may have data for generating corresponding result information.

The storage unit 73 may store data used for machine learning, result data, and the like.

The recognizer 74 may serve as a learning device of the home appliance such as the robot 100.

The recognizer 74 may include an artificial neural network, e.g., a deep neural network (DNN) such as a Convolutional Neural Network (CNN), a Recurrent Neural Network (RNN), a Deep Belief Network (DBN), and the like, and may learn the deep neural network (DNN).

After learning according to the setting, the processor 71 may control the artificial neural network structure of the home appliance such that the robot 100 is to be updated to the learned artificial neural network structure.

The recognizer 74 may receive input data for recognition, recognize attributes of object, space, and emotion contained in the input data, and output the result. The communication unit 72 may transmit the recognition result to the robot 100.

The recognizer 74 may analyze and learn usage-related data of the robot 100, recognize the usage pattern, the usage environment, and the like, and output the result. The communication unit 72 may transmit the recognition result to the robot 100.

Accordingly, the home appliance products such as the robot 100 may receive the recognition result from the server 70, and may operate by using the received recognition result.

The server 70 may receive the speech input signal uttered by the user and perform speech recognition. The server 70 may include a speech recognizer and may include an artificial neural network that is learned to perform speech recognition on the speech recognizer input data and output a speech recognition result.

The server 70 may include a speech recognition server for speech recognition. The speech recognition server may include a plurality of servers that share and perform a certain process during speech recognition. For example, the speech recognition server may include an automatic speech recognition (ASR) server for receiving speech data and converting the received speech data into text data, and a natural language processing (NLP) server for receiving the text data from the automatic speech recognition server and analyzing the received text data to determine a speech command. The speech recognition server may include a text to speech (TTS) server for converting the text speech recognition result outputted by the natural language processing server into speech data and transmitting the speech data to another server or the home appliance.

The server 70 may perform emotion recognition based on the input data. The server 70 may include an emotion recognizer, and the emotion recognizer may include an artificial neural network that is learned to perform emotion recognition on the input data and to output an emotion recognition result.

The server 70 may include an emotion recognition server for emotion recognition. That is, at least one of the servers 70 may be an emotion recognition server having an emotion recognizer for performing emotion recognition.

Figure 5:
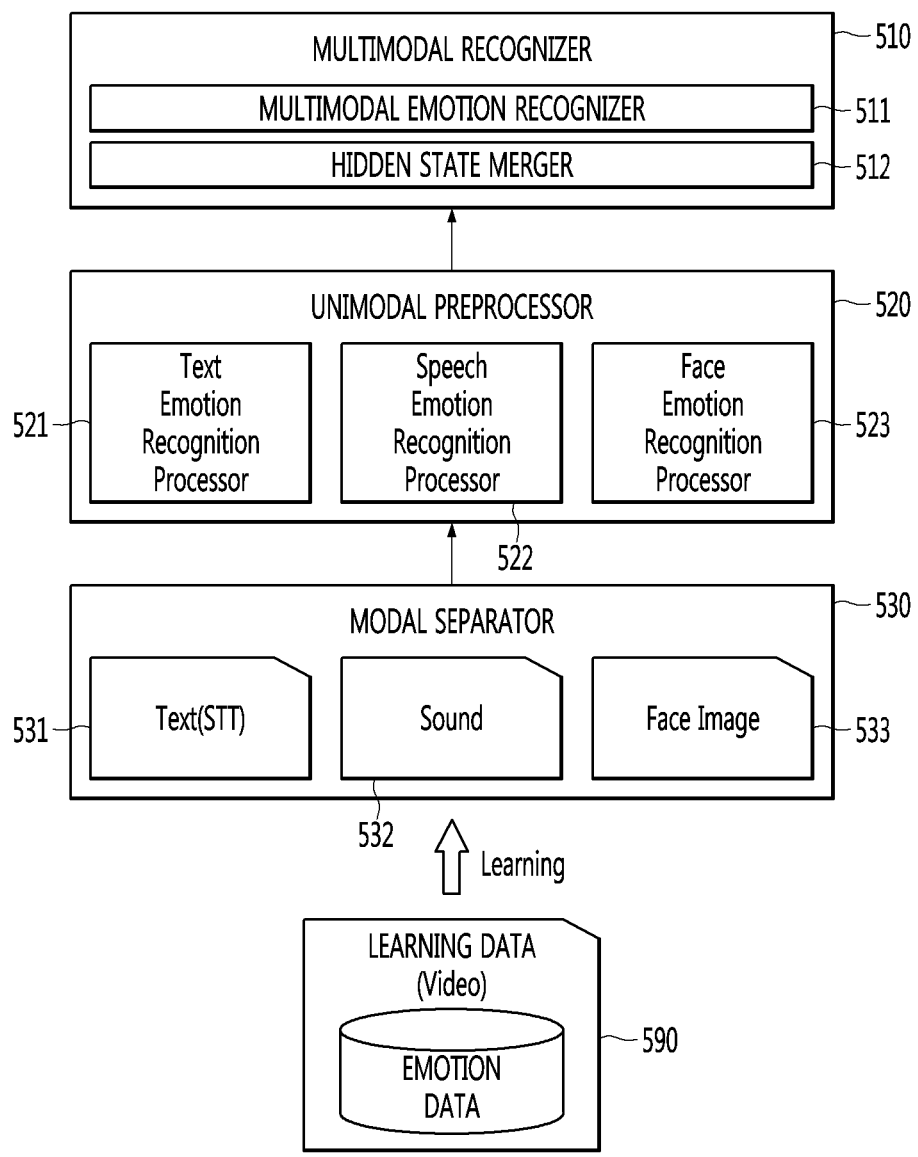
FIG. 5 is an example of an internal block diagram of an emotion recognizer according to an embodiment of the present invention.

FIG. 5 is an example of an internal block diagram of an emotion recognizer according to an embodiment of the present invention.

Referring to FIG. 5, an emotion recognizer 74a provided in the robot 100 or the server 70 may perform deep learning by using emotion data as input data 590 (or learning data).

The emotion recognizer 74a may include a unimodal preprocessor 520 including a plurality of recognizers (or recognition processors) for each modal 521, 522, and 523 that are learned to recognize emotion information of the user included in the unimodal input data, and a multimodal recognizer 510 that is learned to merge the output data of the plurality of recognizers for each modal 521, 522, and 523 and recognize the emotion information of the user included in the merged data.

Emotion data is emotion information data having information on the emotion of the user, and may include emotion information, such as image, speech, and bio-signal data, which can be used for emotion recognition. The input data 590 may be video data including a user's face, and more preferably, the learning data (or input data 590) may further include audio data including user's speech.

Emotion is the ability to feel about stimulus, and is the nature of the mind that accepts sensory stimulation or impression. In emotion engineering, emotion is defined as a complex emotion such as pleasantness and discomfort as a high level of psychological experience inside the human body due to changes in the environment or physical stimulation from the outside.

Emotion may mean feelings of pleasantness, discomfort or the like that occur with respect to stimulation, and emotion may be recognized as any one of N representative emotional states. These N representative emotional states may be named emotion class.

For example, the emotion recognizer 74a may recognize six representative emotion classes such as surprise, happiness, sadness, displeasure, anger, and fear, and may output one of the representative emotion classes as a result of the emotion recognition, and/or may output a probability value for each of six representative emotion classes.

Alternatively, the emotion recognizer 74a may further include a neutrality emotion class indicating a default emotion state in which six emotions do not occur in addition to the emotion classes such as surprise, happiness, sadness, displeasure, anger, and fear, as an emotion that can be recognized and outputted by the emotion recognizer 74a.

The emotion recognizer 74a may output, as an emotion recognition result, any one of the emotion classes selected from surprise, happiness, sadness, displeasure, anger, fear, and neutrality, and/or may output, as an emotion recognition result, the probability value for each emotion class such as surprise x %, happiness x %, sadness x %, displeasure x %, anger x %, fear x %, and neutrality x %.

When the emotion of the user is recognized by the artificial intelligence model which learned deep learning of the emotion to be recognized, the result is outputted as a tagging value of the data used in learning the deep learning.

In a real environment, there may be many examples where the user's emotion can not be finally outputted as a single emotion. For example, although a user may express joy emotion in words, an unpleasant emotion may be expressed in a facial expression. People may often output different emotion for each modal such as speech, image, text, and the like.

Accordingly, when the emotion of the user is recognized and outputted as a final single emotion value, or when different emotions, contradictory emotions, similar emotions, and the like of each voice, image, and text are ignored, the emotion different from the feeling that is actually felt by the user may be recognized.

In order to recognize and manage each emotion based on all the information exposed to the outside of the user, the emotion recognizer 74a according to an example embodiment can recognize the emotion for each unimodal of speech, image, and text, and may have a structure capable of recognizing emotion even in a multimodal.

The emotion recognizer 74a may recognize, for each unimodal, the emotion of the user inputted at a specific time point, and may simultaneously recognize the emotion complexly as a multimodal.

The plurality of recognizers for each modal 521, 522, and 523 may recognize and process a single type unimodal input data which are inputted respectively, and may be also named a unimodal recognizer.

The emotion recognizer 74a may generate the plurality of unimodal input data by separating the input data 590 for each unimodal. A modal separator 530 may separate the input data 590 into a plurality of unimodal input data.

The plurality of unimodal input data may include image unimodal input data, speech unimodal input data, and text unimodal input data separated from the moving image data including the user.

For example, the input data 590 may be moving image data photographed by the user, and the moving image data may include video data in which the user's face or the like is photographed and audio data including a speech uttered by a user.

The modal separator 530 may separate the content of the audio data included in the input data 590 into a text unimodal input data 531 that is acquired by converting the audio data into text data and sound unimodal input data 532 of the audio data such as a speech tone, magnitude, height, etc.

The text unimodal input data may be data acquired by converting a speech separated from the moving image data into text. The sound unimodal input data 532 may be a sound source file of audio data itself, or a file whose preprocessing has been completed, such as removing noise from a sound source file.

The modal separator 530 may separate image unimodal input data 533 (or face image) that includes one or more facial image data from the video data contained in the input data 590.

The separated unimodal input data 531, 532, and 533 may be inputted to the unimodal preprocessor 520 including a plurality of modal recognizers 521, 522, and 523 for each modal that are learned to recognize emotional information of a user based on each unimodal input data 531, 532, and 533.

For example, the text unimodal input data 531 may be inputted to the text emotion recognizer 521 (or text emotion recognition processor) which performs deep learning by using text as learning data.

The sound unimodal input data 532 may be inputted, while being used as the speech learning data, to a speech emotion recognizer 522 (or speech emotion recognition processor) that performs deep learning.

The image unimodal input data 533 (including one or more face image data) may be inputted, while being used as the image learning data, to a face emotion recognizer 523 (or face emotion recognition processor) that performs deep learning.

The text emotion recognizer 521 may recognize emotion of the user by recognizing vocabularies, sentence structures, and the like included in the sound to text (STT) data converted into text. For example, as more words related to happiness are used or a word expressing a strong degree of happiness is recognized, the probability value for the happiness emotion class may be recognized higher than the probability value for other emotion class. Alternatively, the text emotion recognizer 521 may directly output happiness, which is the emotion class corresponding to the recognized text, as the emotion recognition result.

The text emotion recognizer 521 may also output a text feature point vector along with emotion recognition result.

The speech emotion recognizer 522 may extract the feature points of the input speech data. The speech feature points may include tone, volume, waveform, etc. of speech. The speech emotion recognizer 522 may determine the emotion of the user by detecting a tone of speech or the like.

The speech emotion recognizer 522 may also output the emotion recognition result and the detected speech feature point vectors.

The face emotion recognizer 523 may recognize the facial expression of the user by detecting the facial area of the user in the input image data and recognizing facial expression landmark point information, which is the feature point constituting the facial expression. The face emotion recognizer 523 may output the emotion class corresponding to the recognized facial expression or the probability value for each emotion class, and also output the facial feature point (facial expression landmark point) vector.

The plurality of recognizers for each modal may include an artificial neural network corresponding to the input characteristic of the unimodal input data which are respectively inputted. A multimodal emotion recognizer 511 may also include an artificial neural network corresponding to the characteristic of the input data.

For example, the face emotion recognizer 523 for performing image-based learning and recognition may include a convolutional neural network (CNN), other emotion recognizers 521 and 522 may include a deep neural network (DNN), and the multimodal emotion recognizer 511 may include an artificial neural network of a recurrent neural network (RNN).

The emotion recognizer for each modal 521, 522, 523 may recognize the emotion information included in the respectively inputted unimodal input data 531, 532, 533, and may output the emotion recognition result. For example, the emotion recognizer for each modal 521, 522, 523 may output the emotion class having the highest probability among a certain number of preset emotion classes as an emotion recognition result, or output the probability value for each emotion class as an emotion recognition result.

The emotion recognizer for each modal 521, 522, 523 may learn and recognize text, speech, and image in respective deep learning structures, and derive intermediate vector value composed of feature point vector for each unimodal.

The multimodal recognizer 510 may perform multimodal deep learning by using the intermediate vector value of each speech, image, and text.

As described above, since the input of the multimodal recognizer 510 is generated based on the output of the emotion recognizer for each modal 521, 522, 523, the emotion recognizers for each modal 521, 522 and 523 may operate as a kind of preprocessor.

The emotion recognizer 74a may use a total four deep learning models including three deep learning models of emotion recognizers for each modal 521, 522 and 523, and one deep learning model of multimodal recognizer 510.

The multimodal recognizer 510 may include a merger 512 (or hidden state merger) for combining the feature point vectors outputted from the plurality of the recognizers for each modal 521, 522 and 523, and a multimodal emotion recognizer 511 that is learned to recognize emotion information of the user included in the output data of the merger 512.

The merger 512 may synchronize the output data of the plurality of the recognizers for each modal 521, 522 and 523, and may perform vector concatenation of the feature point vectors to output to the multimodal emotion recognizer 511.

The multimodal emotion recognizer 511 may recognize the emotion information of the user from the input data and output the emotion recognition result.

For example, the multimodal emotion recognizer 511 may output the emotion class having the highest probability among a certain number of preset emotion classes as an emotion recognition result, or may output the probability value for each emotion class as an emotion recognition result.

Accordingly, the emotion recognizer 74a may output a plurality of unimodal emotion recognition results and a single multimodal emotion recognition result.

The emotion recognizer 74a may output a plurality of unimodal emotion recognition results and a single multimodal emotion recognition result as a level (probability) for each emotion class.

For example, the emotional recognizer 74a may output the probability value for each emotion class of surprise, happiness, neutrality, sadness, displeasure, anger, and fear. As the probability value becomes higher, there may be a high possibility of a recognized emotion class. The total sum of the probability values of seven types of emotion classes may be 100%.

The emotion recognizer 74a may output the emotion recognition result 521, 522, and 523 of each of the plurality of recognizers for each modal and the complex emotion recognition result including the emotion recognition result of the multimodal recognizer 511.

Accordingly, the robot 100 may provide an emotion exchange user experience (UX) based on the emotion recognition result of three unimodals and one multimodal.

According to the setting, the emotion recognizer 74a may output the recognition result occupying a majority part of the complex emotion recognition result and the recognition result having the highest probability value as a final recognition result. Alternatively, the controller 140 (of the robot 100) that received a plurality of emotion recognition results may determine a final recognition result based on a certain criterion.

The emotion recognizer 74a may recognize and manage the emotion of each of the speech (speech tone, etc.), the image (facial expression, etc.), and the text (the content of talk, etc.) by level. Accordingly, the emotion exchange user experience (UX) may be treated differently for each modal.

The emotion recognition result for each unimodal (speech, image, text) and the multimodal emotion recognition result value may be simultaneously outputted based on one time point. The emotion of the speech, image, and text inputted at one time point may be recognized in a complex manner. Thus, the emotion tendency of the user may be determined by recognizing inconsistent emotion for each unimodal in the multimodal emotion. Accordingly, even if a negative input is received from some modal, it may be possible to provide the emotion exchange user experience (UX) corresponding to a positive input that is a real emotion state of user by recognizing the overall emotion.

The robot 100 may be equipped with the emotion recognizer 74a or may communicate with the server 70 having the emotion recognizer 74a so as to determine the emotion for each unimodal of only the user.

The emotion pattern of only the user may be analyzed and the emotion recognition for each modal may be utilized for an emotion care (treatment).

In the example of contradictory emotion having different recognition result for each modal of the input data, emotion methods may have difficulty in analyzing emotion by mapping the emotions into one.

However, according to example embodiments of the present invention, various real-life situations may be processed most suitably through a plurality of inputs and outputs.

In order to complement the input recognizer having low performance, embodiments may constitute a recognizer structure in which a plurality of recognizers 511, 521, 522, and 523 mutually complement a plurality of inputs and outputs in a fusion manner.

The emotion recognizer 74a may separate speech into sound and meaning, and make a total of three inputs of image, speech (sound), and STT from the image and speech inputs.

In order to achieve optimum performance for each of the three inputs, the emotion recognizer 74a may be configured to have a different artificial neural network model for each input, such as a convolutional neural network (CNN) and a long short-term memory (LSTM). For example, the image-based recognizer 523 may have a CNN structure, and the multimodal emotion recognizer 511 may have a long-short-term memory (LSTM) structure. Thus, a customized neural network may be configured for each input characteristic.

The output of the unimodal recognizers 521, 522, and 523 (or recognition processors) for each input may be the probability value for the seven types of emotion classes and the vector value of the feature points expressing this emotion well.

The multimodal recognizer 510 may combine the vector value of the feature points that express the emotion well through a fully connected layer and the LSTM, rather than simply calculating the emotion values of the three inputs by a statistical method, thereby helping to improve performance in such a manner that another recognizer helps one recognizer to deal with a difficult problem, and covering various cases in real life.

For example, even if only a word is heard in a place where face recognition is difficult, in the emotion recognizer 74a, the speech based recognizer 521, 522 and the multimodal emotion recognizer 511 may recognize the emotion of the user.

Since the emotion recognizer 74a can recognize the complex emotion state of the user by merging each recognition result for the image, speech, and character data with the multimodal recognition result, the emotion recognition can be achieved for various situations in real life.

According to an example embodiment, a video call may be performed through a robot, and an emotion call service may be provided by combining emotion recognition/expression technology with a video call.

The robot may recognize emotion such as happiness, sadness, anger, surprise, fear, neutrality, and displeasure of at least one of the video call participants, map the recognized emotions to a character, and/or display this during a call.

According to an example embodiment, emotion recognition may be performed in real time during a video call and emotion may be transmitted to the counterpart, thereby helping people to communicate with each other.

An emotion call service may be provided through a motion function that can not be performed by a portable terminal and/or the like but can be performed only by a robot. A fun factor and a lock-in effect may be expected due to the robot that follows the motion of a participant during a video call.

An avatar replacing a specific gesture and facial expression of the user may be provided through emotion recognition. Depending on a user setting or an apparatus used for video call, the video call can be achieved without a speaker's face.

Figure 6:
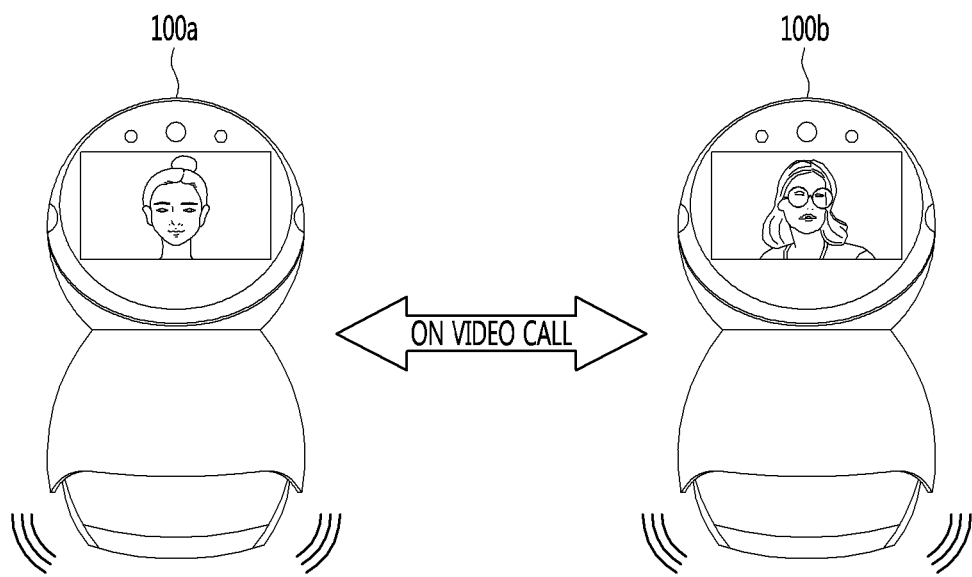
FIGS. 6 to 8 are diagrams for explaining a video call by using a robot according to an embodiment of the present invention.
Figure 7:
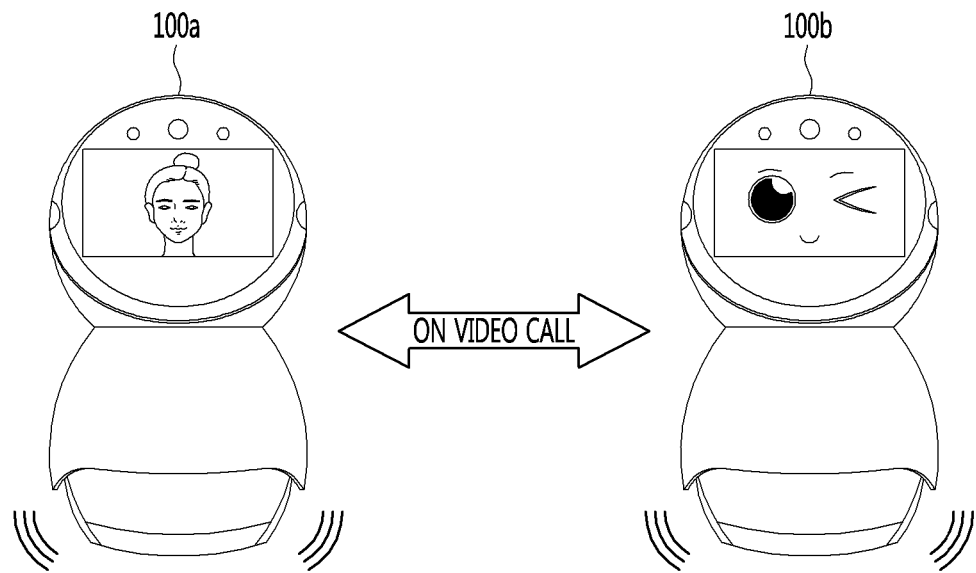
Figure 8:
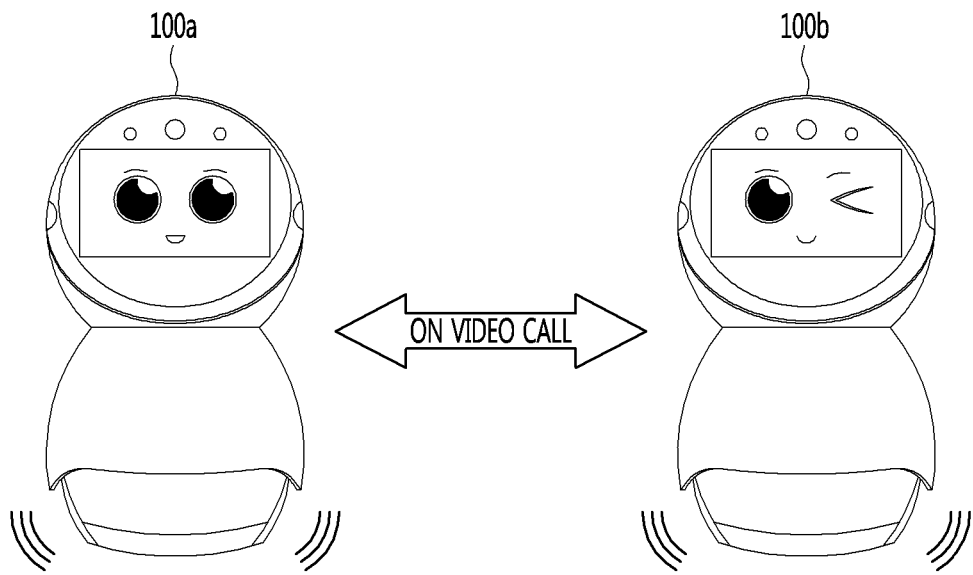

FIGS. 6 to 8 are diagrams for explaining a video call by using a robot according to an example embodiment. Other embodiments and configurations may also be provided.

Even it is shown that a first robot 100a and a second robot 100b are directly connected to perform a video call, the first robot 100a and the second robot 100b may be connected via a server providing a video call service to perform the video call.

FIG. 6 shows that two persons may use a video call by using a first robot 100a and a second robot 100b.

As shown in FIG. 6, a P2P video call between the first robot 100a and the second robot 100b can be performed. Additionally, unlike FIG. 6, a P2P video call between the robot 100 and a portable terminal may also be performed.

During a video call by using the robot 100, faces of the caller and the receiver may be hidden to accomplish a call only with a character, and the character can be identified by following the emotion and feature point of only the caller and receiver.

The method of identifying the emotion and the feature point of a specific user may be performed by characterizing and expressing motion, speech, and/or facial movement.

FIG. 7 shows an example in which a user of the second robot 100b performs a video call by using a character that expresses emotion of the user of the first robot 100a. The user of the second robot 100b may recognize the emotion of the video call counterpart, based on the video call data received from the first robot 100a, and may perform a video call while watching the character expressing the emotion of the recognized counterpart.

FIG. 8 shows an example in which both of the users of the first robot 100a and the second robot 100b may perform the video call by using a character.

During the video call, the emotion of the user may be recognized, and various characters mapped to the recognition result value may be overlaid on the face of the speaker or the face of the speaker may be replaced with the character, so that the emotion of the counterpart can be easily determined, and the fun factor and the lock-in effect can be expected.

During the video call, a gesture of the user may be recognized and a corresponding gesture may be mapped to motion of the robot to be operated, so that the user can intuitively recognize the emotion of the counterpart through the motion of the robot.

Depending on an example embodiment, the face of the user and surrounding environment information may be recognized for a user who has a feeling of discomfort based on exposure of the face and the surrounding environment, and a character and a background image may be generated and used based on the recognized information. Accordingly, a user who has a feeling of discomfort in the video call due to exposure of the surrounding environment may use the video call.

Figure 9:
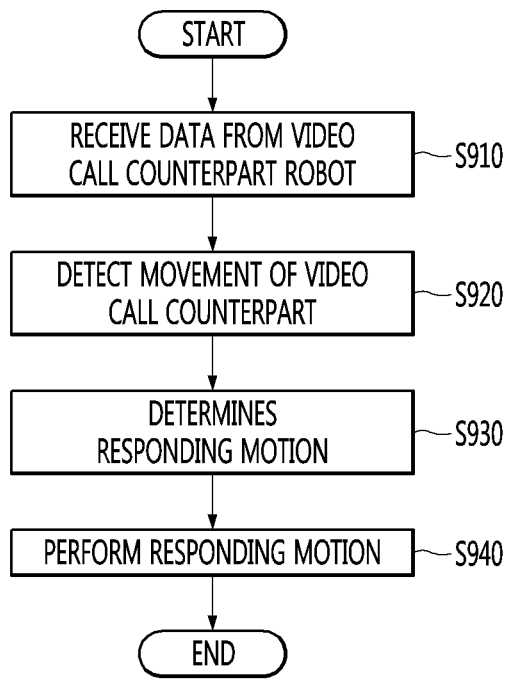
FIG. 9 is a flowchart illustrating an operation method of a robot system according to an embodiment of the present invention.

FIG. 9 is a flowchart illustrating an operation method of a robot system according to an example embodiment. Other embodiments and operations may also be provided.

Referring to FIG. 9, the robot 100 according to an embodiment may receive image data, speech data, and/or the like from a video call counterpart robot (S910).

The robot 100 may detect movement of the video call counterpart included in the received video data (S920), determine a first motion for responding to the motion of the detected video call counterpart (S930), and perform the determined first motion (S940) (i.e., perform responding motion).

For example, the controller 140 may detect, from the receiving image, rotating of the head of the video call counterpart. In this example, the controller 140 may control the robot 100 to rotate the head in the same direction in correspondence with the head rotation of the video call counterpart.

When detecting lifting an arm of the video call counterpart, the controller 140 may determine a response motion for responding to the arm lifting operation. In the example of a human body type robot including an arm, the controller 140 may control the robot to lift its arm. In the example of the robot 100 having no arm, the robot may perform a replacement operation such as shaking of the head or the body in response to the movement of the user.

The controller 140 may decide (or determine) a response motion for responding to the movement of the user based on hardware of the robot 100, and control to perform the decided response motion.

Embodiments may use various known technologies for recognizing movement of an object based on an image. For example, an example embodiment may compare two consecutive images to determine movement of a certain object, direction and amount of movement, and/or the like.

According to an example embodiment, during a video call, movement may be imitated in the same way as a person by adding specialized motion information of the robot. The avatar character may be generated and displayed by using the recognized emotion information. Accordingly, communication of emotion may be achieved during the video call.

According to an embodiment of the present invention, a robot, a robot system, and an operation method thereof may be configured to detect movement of a video call counterpart robot included in image data, received from a video call counterpart robot, and perform response motion, thereby operating according to movement of a video call participant.

For example, when a first user 1a uses the first robot 100a and performs a video call with a second user 1b who uses the second robot 100b, the first robot 100a may detect movement of the second user 1b included in the image data received from the second robot 100b and may perform a response motion, thereby operating according to movement of a video call participant.

The second robot 100b may detect movement of the first user 1a included in the image data received from the first robot 100a and may perform a response motion, thereby operating according to movement of a video call participant.

According to an embodiment of the present invention, a robot, a robot system, and an operation method thereof may be configured to detect a movement of a video call counterpart who uses a video call counterpart robot (included in image data received from a video call counterpart robot) to cancel movement information of the user detected or received, and to determine a motion for responding to the movement of the detected video call counterpart.

For example, when the first user 1a uses the first robot 100a and performs a video call with the second user 1b who uses the second robot 100b, the first robot 100a may detect movement of the second user 1b included in the image data received from the second robot 100b, and the first robot 100a may cancel movement information of the first user 1a who is the user of the first robot 100a. Accordingly, the motion for responding to the movement of the second user 1b, who is the detected video call counterpart, may be accurately determined.

The second robot 100b may detect movement of the first user 1a included in the image data received from the first robot 100a, and the second robot 100b may cancel movement information of the second user 1b who is the user of the second robot 100b. Accordingly, the motion for responding to the movement of the first user 1a who is the detected video call counterpart may be accurately determined.

In the present disclosure, embodiments may be described based on an example where the first user 1a uses the first robot 100a and performs a video call with the second user 1b who uses the second robot 100b.

Therefore, unless otherwise specified, based on the first robot 100a, a user is the first user 1a, a video call counterpart is the second user 1b, and a video call counterpart robot is the second robot 100b. In the same manner, based on the second robot 100b, a user is the second user 1b, a video call counterpart is the first user 1a, and a video call counterpart robot is the first robot 100a.

FIGS. 10 and 11A-11C are diagrams for explaining a motion misrecognition that may occur during a video call, and for explaining a misrecognition problem that may occur in a robot that performs a response motion according to a movement of a video call counterpart.

Figure 10:
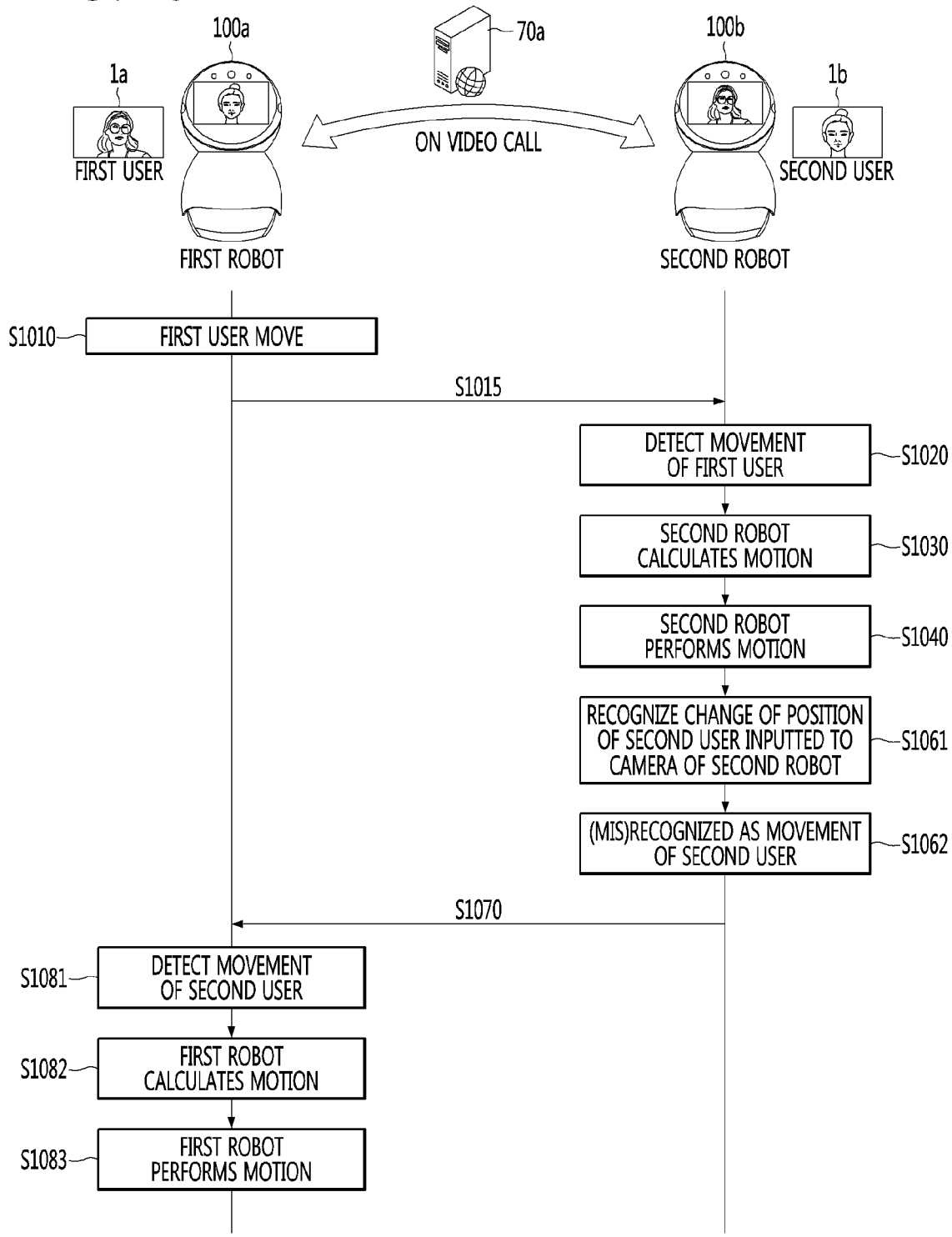
FIGS. 10 and 11A to 11C are diagrams for explaining a motion misrecognition that may occur during a video call.

FIG. 10 shows an example where the first user 1a uses the first robot 100a and the second user 1b uses the second robot 100b to perform a video call.

The first robot 100a and the second robot 100b may transmit and receive video call data (including image data and speech data) during a video call.

The first robot 100a and the second robot 100b may be connected to the server 70a which provides a video call service. The first robot 100a may transmit the video call data to the second robot 100b through the server 70a, and the second robot 100b may transmit the video call data to the first robot 100a through the server 70a.

When the first user 1a moves (S1010), the image data transmitted by the first robot 100a to the second robot 100b may include a state in which the first user 1a moves (S1015).

Accordingly, the second robot 100b may detect movement of the first user 1a using the first robot 100a included in the image data received from the first robot 100a (S1020).

The second robot 100b may determine (or calculate) a first motion for responding to the detected movement of the first user (S1030), and may perform the determined motion (S1040).

When the second robot 100b moves, a camera disposed in the front side may move according to movement of the second robot 100b. Accordingly, when the second robot 100b moves, the position of the second user 1b inputted to the camera of the second robot 100b may change (S1061).

That is, when the second robot 100b moves even though the second user 1b does not move, it may be recognized that the second user 1b moves in an image acquired by the camera of the second robot 100b (S1062).

The first robot 100a receiving the image acquired by the camera of the second robot 100b (S1070) may detect the movement of the second user 1b while depending on only the received image data (S1081).

The motion of the second robot 100b corresponds to the movement of the first user 1a. However, since the second user 1b moves in the image data transmitted by the second robot 100b according to the movement of the second robot 100b, the first robot 100a may determine that the second user 1b has moved (S1081).

Then, the first robot 100a determines (or calculates) the motion responding to the movement of the second user 1b (S1082), and performs a malfunction for performing a response motion (S1083).

Embodiments may synchronize motion of the robot with movement of the sender and the receiver so that video call participants can behave through feelings of empathy as if the robot is a caller/receiver in a video call between the robot and the robot.

The motion of the sender may be recognized by the robot of the receiver, and the movement of the face of the sender can be reproduced by robot motion of the receiver.

However, during the process in which the movement of the sender is reproduced by the robot motion of the receiver, even if there is no movement of the receiver, it may be recognized that the receiver moves as the position information of the camera 120 disposed on the front of the robot is changed, so that an error that the robot of the sender moves may occur.

Figure 11A:
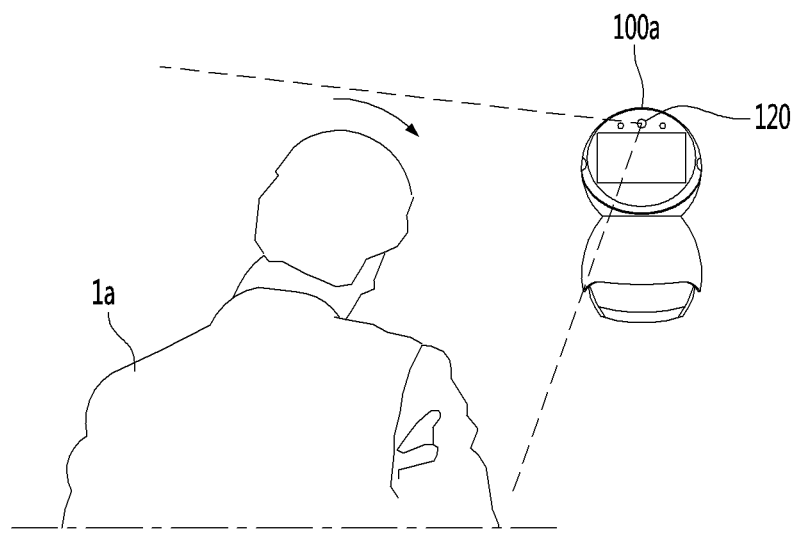
Figure 11B:
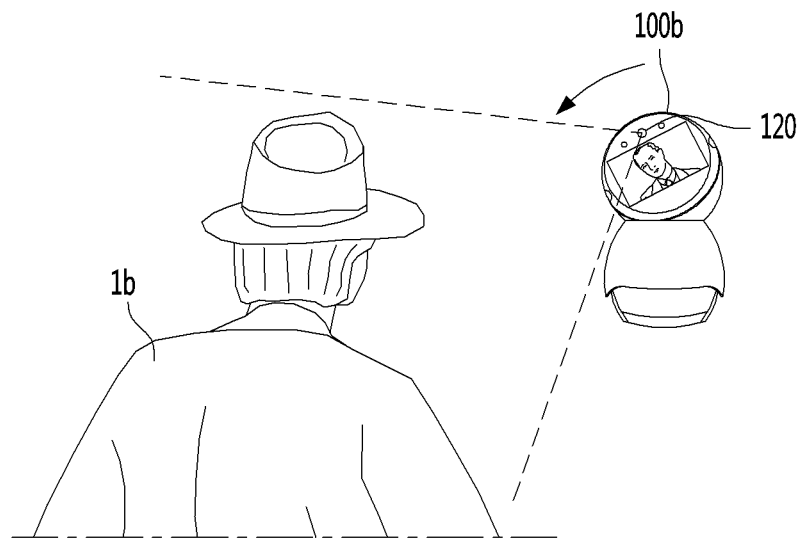

For example, as shown in FIGS. 11A and 11B, when the first user 1a tilts the face to the right, the second robot 100b detecting the movement of the first user 1a may perform a response motion in which the head or the entire body is tilted to the right. If the second robot 100b can not reproduce the movement of the first user 1a intactly, it may perform an alternate operation.

The second user 1b may remain still without moving.

However, the camera 120 may move as the second robot 100b performs a response motion in which the head or the whole body tilts to the right, so that it can be displayed that the second user 1b tilts his/her face to the left in the image acquired by the camera 120.

Figure 11C:
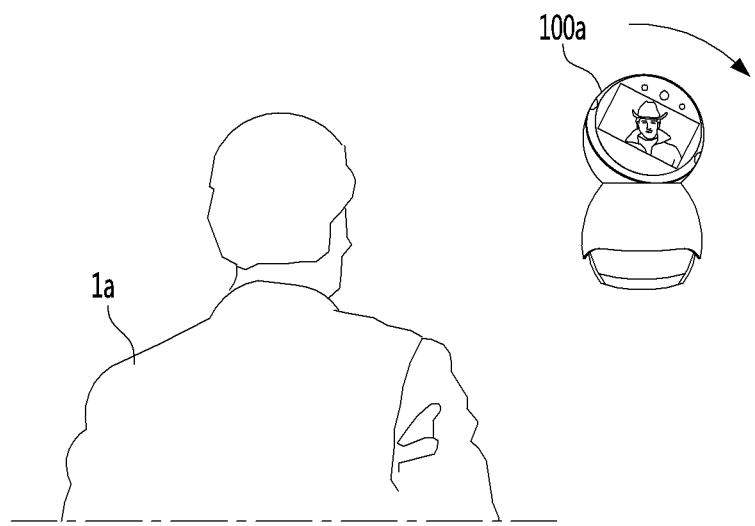

Referring to FIG. 11C, the first robot 100a recognizing the image as if the second user 1b tilts his/her face to the left may perform a response motion in which the head or the whole body tilts to the left in order to reproduce the movement of the second user 1b.

However, since the second user 1b has not moved, the first robot 100a may mis-recognize the movement of the second user 1b, and the motion of the first robot 100a may become a malfunctioning motion.

Therefore, there is a need for a method for preventing such misrecognition and/or malfunctioning.

According to an example embodiment, the first robot 100a and the second robot 100b, which perform a video call, may detect movement of the user of the video call counterpart included in the image data received from the video call counterpart robot.

The first robot 100a and the second robot 100b may cancel the movement information of the user detected by the cameras respectively provided by the first robot 100a and the second robot 100b, or the movement information received from the video call counterpart robot, with respect to the detected movement of the user of the video call counterpart.

The first robot 100a may cancel the movement of the first user 1a detected by the image acquisition unit 120 from the movement of the second user 1b of the video call counterpart detected as the image, and may determine a response motion only for the remaining motion component.

Alternatively, the first robot 100a may receive the movement information of the second robot 100b from the second robot 100b, and may cancel the movement information of the second robot 100b received from the movement of the second user 1b of the video call counterpart detected as the image, and may determine a response motion only for the remaining movement component.

The second robot 100b may cancel the movement of the second user 1b detected by the image acquisition unit 120 from the movement of the first user 1a of the video call counterpart detected as the image, and may determine a response motion only for the remaining movement component.

Alternatively, the second robot 100b may receive the movement information of the first robot 100a from the first robot 100a, may cancel the movement information of the first robot 100a received from the movement of the first user 1a of the video call counterpart detected as the image, and may determine a response motion only for the remaining movement component.

Thereafter, the first robot 100a and the second robot 100b may perform a motion responding to movement of the video call counterpart user.

Embodiments of the present invention may be described in detail with reference to the drawings.

FIG. 12 is a flowchart illustrating a method of operating a robot and a robot system (including the robot) according to an example embodiment of the present invention. Other embodiments and operations may also be provided.

Referring to FIG. 12, during the video call, the first robot 100a may transmit video call data (including image data) to the second robot 100b (S1210).

The first robot 100a may transmit the video call data to a server providing a video call service, and the server may transmit the received video call data to the second robot 100b.

If the first user 1a has moved, the image data received by the second robot 100b includes a state in which the first user 1a moves, and the second robot 100b may detect movement of the first user 1a in the received image (S1220).

Accordingly, the second robot 100b may detect the movement of the first user 1a using the first robot 100a included in the image data received from the first robot 100a (S1220).

The second robot 100b may determine a first motion for responding to the detected movement of the first user (S1230), and may perform the determined first motion (S1240).

The second robot 100b may transmit the video call data (including the image data) to the first robot 100a (S1250).

Similar to S1210, the second robot 100b may transmit the video call data to the server providing the video call service, and the server may transmit the received video call data to the first robot 100a.

The first robot 100a may detect the movement of the second user 1b using the second robot 100b included in the image data received from the second robot 100b (S1260).

In order to prevent misrecognition and/or malfunction, the first robot 100a may cancel the detected or received movement information of the first user 1a from the detected movement information of the second user 1b (S1270), and may determine a second motion responding to the detected movement of the second user (S1280).

The movement information of the first user 1a may be based on information received from the second robot 100b which is a video call counterpart robot during a video call. For example, the first robot 100a may receive movement information of the first user 1a detected by the second robot 100b. Alternatively, the first robot 100a may receive the movement information of the second robot 100b from the second robot 100b, and may estimate the movement information of the first user 1a based on the movement information of the second robot 100b.

In another embodiment, the first robot 100a may recognize and store the movement of the first user 1a, which is photographed by the camera of the first robot 100a.

The movement information of the first user 1a may be canceled with respect to the detected movement information of the second user 1b, and the movement or a specific operation may be determined only for the remaining movement component, so that the robot can accurately follow the movement of the counterpart.

FIG. 13 is a flowchart illustrating a method of operating a robot and a robot system (including the robot) according to an example embodiment of the present invention. Other embodiments and operations may also be provided.

Referring to FIG. 13, if the first user 1a moves (S1310), the second robot 100b may detect the movement of the first user 1a based on the photographed image of the first user 1a (S1315).

The second robot 100b may determine a response motion for responding to the movement of the first user 1a (S1320), and may perform the determined response motion (S1325).

Depending on an embodiment, a reference value may be set when determining a movement. For example, when the detected movement of the first user is greater than a certain reference value, the second robot 100b determines that there is movement and may calculate a motion responding to the detected movement of the first user 1a (S1320).

Accordingly, the second robot 100b may be prevented from moving too much inefficiently or malfunctioning.

The second robot 100b may transmit the detected movement information of the first user 1a to the first robot 100a (S1333), and the first robot 100a may store the movement information of the first user 1a received from the second user 100b (S1340).

Depending on an embodiment, the second robot 100b may generate movement information of the first user 1a such as rotation for transmission (S1330), and may transmit the generated movement information of the first user 1a to the first robot 1a (S1333).

The second robot 100b may recognize that the position of the second user inputted to the camera may change according to performance of the determined first motion (S1336).

The second robot 100b may prevent misrecognition by recognizing that the position of the second user 1b, which is not moved, is changed in the image by changing the position of the camera due to performance of the response motion (S1336).

The first robot 100a may detect movement of the second user 1b based on the received image (S1350).

When the first robot 100a determines a second motion for responding to the detected movement of the second user 1b, the stored movement information of the first user 1a may be canceled for the detected movement information of the second user 1b (S1360).

If there is no movement that is equal to or greater than a reference value, as a result of canceling the stored movement information of the first user 1a for the detected movement information of the second user 1b, the first robot 100a may determine that the second user 1b has not moved, and may process not to perform motion (S1365).

Accordingly, if it is determined that all the detected movement of the second user 1b is caused by the movement information of the first user 1a, the second user 1b is not moved, so that the first robot 100a does not perform response motion.

If there is no movement that is equal to or greater than a reference value, as a result of canceling the stored movement information of the first user 1a for the detected movement information of the second user 1b, the first robot 100a may determine the response motion based on the movement component that is remained after the cancellation and perform a response motion.

Even in this example, the first robot 100a that performed response motion transmits the detected movement information of the second user to the second robot 100b, thereby preventing malfunction of the second robot 100b.

In the present embodiment, after separately transmitting/receiving movement information and storing, the robots 100a and 100b perform compensation processing by using the movement information stored in determining the response motion.

That is, the robots 100a and 100b may estimate that the robot motion will move by transmitting the moving information (left-right/up-down rotation information) to the video call counterpart robot that is on a call, and may improve the error of mis-recognizing that the video call counterpart coming into the sight of a camera moves even though it does not moves.

During the video call, the second robot 100b may display at least one of an image captured by a camera or an image received from the first robot 100b. The first robot 100b may display at least one of an image photographed by an installed camera or an image received from the second robot 100b.

The robots 100a in a video call may display only the user on the display 182, display only the video call counterpart, and/or display both the user and the video call counterpart.

As described with reference to FIG. 5, the robot 100 or the server 70 includes the emotion recognizer 74, and may recognize the emotion of the user or the video call counterpart.

For example, the robot 100 may autonomously recognize the emotion of the video call counterpart, and may transmit emotion by reflecting the emotion recognition result on at least one of avatar character, motion, and speech.

Alternatively, the second robot 100b may transmit the image data and the speech data received from the first robot 100a to the server 70 having the emotion recognizer 74 learned with a plurality of unimodal inputs and a multimodal input based on the plurality of unimodal inputs, and may receive the emotion recognition result of the first user 1a for each of the plurality of unimodal inputs and the emotion recognition result of the first user 1a for the multimodal input from the server 70.

The second robot 100b may express emotion by reflecting the received emotion recognition result on at least one of an avatar character, a motion, and a speech.

Figure 14:
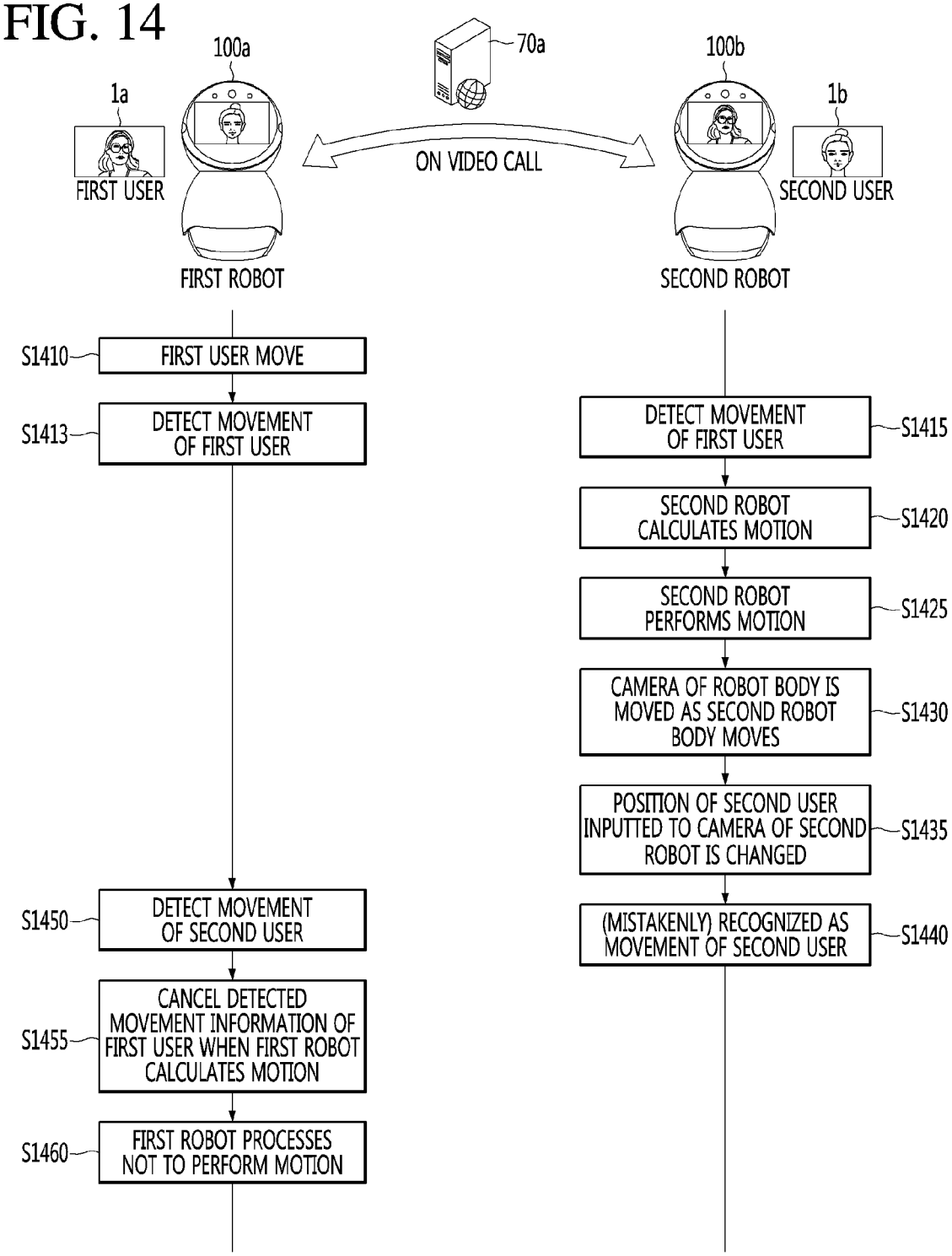
FIG. 14 is a flowchart illustrating a method of operating a robot and a robot system (including the robot) according to an example embodiment of the present invention.

FIG. 14 is a flowchart illustrating a method of operating a robot and a robot system (including the robot) according to an example embodiment of the present invention, which calculates and cancels motion based on a face image of a sender/receiver in a receiving robot side. Other embodiments and operations may also be provided.

Although not shown in FIG. 14, in the present embodiment, the robot may store detected movement information of a sender/receiver, and may use this information for correction in determining a response motion.

The robot may store timing information of the movement together with the detected movement information of sender/receiver, and may utilize the coincidence of timing information to determine motion. That is, in the robot, the time information of movement may be recorded, moving information of a person in the image may be recognized to compare and cancel with the stored information so that a correct response motion to be performed can be calculated.

Referring to FIG. 14, if the first user 1a moves (S1410), the first robot 100a can detect the movement of the first user 1a based on the image photographed by the first user 1a (S1413).

If the first user 1a moves (S1410), the second robot 100b may detect the movement of the first user 1a based on the image photographed by the first user 1a, and may store the detected information (S1415).

The second robot 100b may store movement information of the detected first user 1a. The second robot 100b may store the movement information of the first user 1a detected based on the received image and the timing information corresponding to the movement information.

The second robot 100b may store movement information of the second user 1b acquired through a camera provided at the front surface and timing information corresponding to the movement information.

In a similar manner, the first robot 100a may detect the movement of the first user 1a based on the image inputted to the camera, and store the detected movement information of the first user 1a (S1413). The first robot 100a may store movement information of the second user 1b detected based on the image received from the second robot 100b and timing information corresponding to the movement information.

The second robot 100b may determine a response motion for responding to the movement of the first user 1a (S1420), and may perform the determined response motion (S1425).

According to the performance of the response motion (S1425), the camera disposed in the front surface of the second robot 100b may move (S1430). If the camera moves (S1435), the second user who does not move within the image acquired through the moving camera may be mistakenly recognized as relatively moving (S1440).

However, the second robot 100b recognizes that the position of the non-moving second user 1b is changed in the image as the position of the camera is changed due to performance of the response motion, and ignores or exceeds the movement of the second user in the image acquired through the camera to prevent misrecognition (S1440).

The first robot 100a may detect the movement of the second user 1b based on the received image (S1450).

When determining a second motion responding to the detected movement of the second user 1b, if the detected movement information of the second user 1b matches the stored movement information of the first user 1b, the first robot 100a may determine that the second user 1b has not moved (S1455).

If the detected movement information of the second user 1b matches the stored movement information of the first user 1a, it may be determined that the movement of the second user 1b detected in the received image is caused by a response motion for responding to the movement of the first user 1a.

That is, when determining a second motion for responding to the detected movement of the second user 1b, the first robot 100a may cancel the movement information of the first user 1*a* which is autonomously detected and stored with respect to the detected movement information of the second user 1*b* (S1455).

If two movement information are matched and there is no movement that is equal to or greater than a reference value in a difference in the two movement information as a result of canceling the stored movement information of the first user 1*a* with respect to the detected movement information of the second user 1*b*, the first robot 100*a* may determine that the second user 1*b* has not moved, and may process not to perform the motion (S1460).

That is, if it is determined that all the detected movement of the second user 1*b* are caused by the movement information of the first user 1*a*, it means that the second user 1*b* is not moved, so that the first robot 100*a* does not perform response motion.

For more accurate determination, it can be verified whether the timing information for the movement is also matched. That is, when the detected movement information and the timing information of the second user 1*b* match with the stored movement information and the timing information of the first user 1*a*, it may be determined that the second user 1*b* has not moved.

Figure 15:
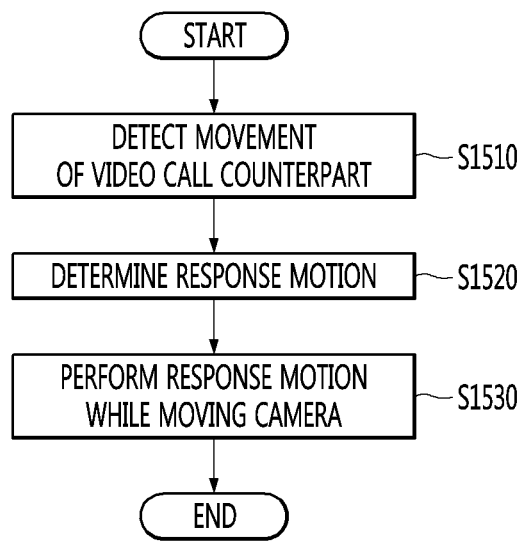
FIG. 15 is a flowchart illustrating a method of operating a robot and a robot system (including the robot) according to an embodiment of the present invention.
Figure 16:
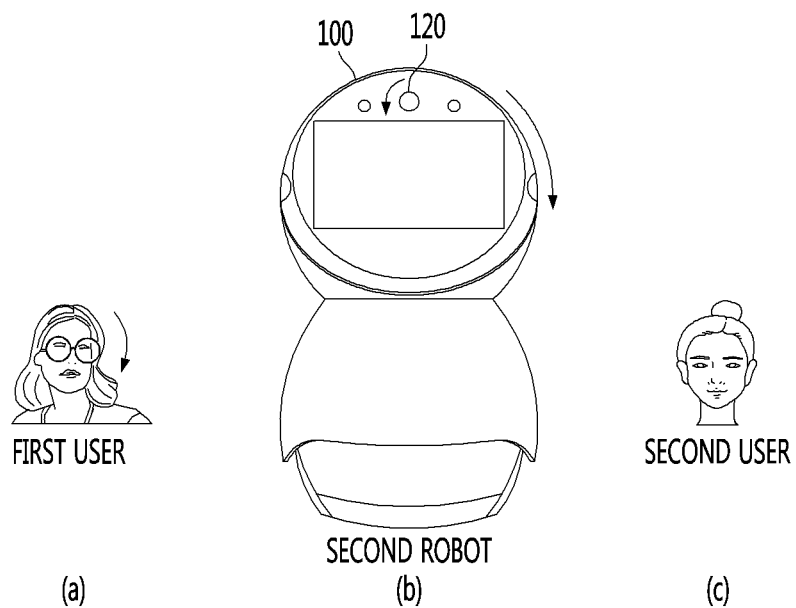
FIG. 16 is a diagram for explaining a method of operating a robot and a robot system (including the robot) according to an embodiment of the present invention.

FIG. 15 is a flowchart illustrating a method of operating a robot and a robot system (including the robot) according to an example embodiment of the present invention. FIG. 16 is a diagram for explaining a method of operating a robot and a robot system (including the robot) according to an example embodiment of the present invention. Other embodiments, operations and configurations may also be provided.

Referring to FIG. 15, the robot 100 (e.g., a receiving robot) may detect movement of a video call counterpart based on a received image (S1510), and may determine a response motion for responding to the detected movement (S1520).

The robot 100 may perform the determined response motion to reproduce and transmit the movement of the video call counterpart to the user (S1530).

Additionally, when the emotion recognition result is reflected in the movement, the degree of motion may be enhanced or mitigated according to the emotion recognition result such as joy, surprise, and/or the like.

The robot 100 may perform a determined response motion while moving the camera so as to prevent the video call counterpart robot from malfunctioning according to performance of the response motion (S1530).

The robot 100 having a camera capable of moving (such as sliding, rotating, or the like) may move the camera in a direction opposite to the detected movement of the video call counterpart, thereby preventing the video call counterpart from moving in the photographing image.

The robot 100 may include a camera capable of adjusting the angle of view, and may move the camera in a direction opposite to the response motion to fix an object in the image.

As shown in FIG. 16(*a*), when the first user 1*a* moves, the second robot 100*b* detects the movement of the first user 1*a* based on the received image, and may determine a motion responding to the movement of the first user 1*a* and a motion performance value (motion amount).

Referring to FIG. 16(*b*), when performing a motion responding to the movement of the first user 1*a*, the second robot 100*b* may move the angle of view of the camera 120 in the direction opposite to the responding motion based on the motion performance value.

As shown in FIG. 16(*c*), the second user 1*b* may not move in the image acquired by the camera 120 of the second robot 100*b*. Additionally, the first robot 100*a* received the image of FIG. 16(*c*) may correctly recognize that the second user 1*b* has not moved, so that the misrecognition and malfunction can be prevented.

In the present embodiment, a reference value may be set in order to prevent the performance of excessive response motion. For example, if the detected movement of the first user is greater than a certain reference value, it is determined that there is movement so that a motion responding to the detected movement of the first user can be calculated. Accordingly, the robot may not react to small movement that is lower than a certain reference value.

Figure 17:
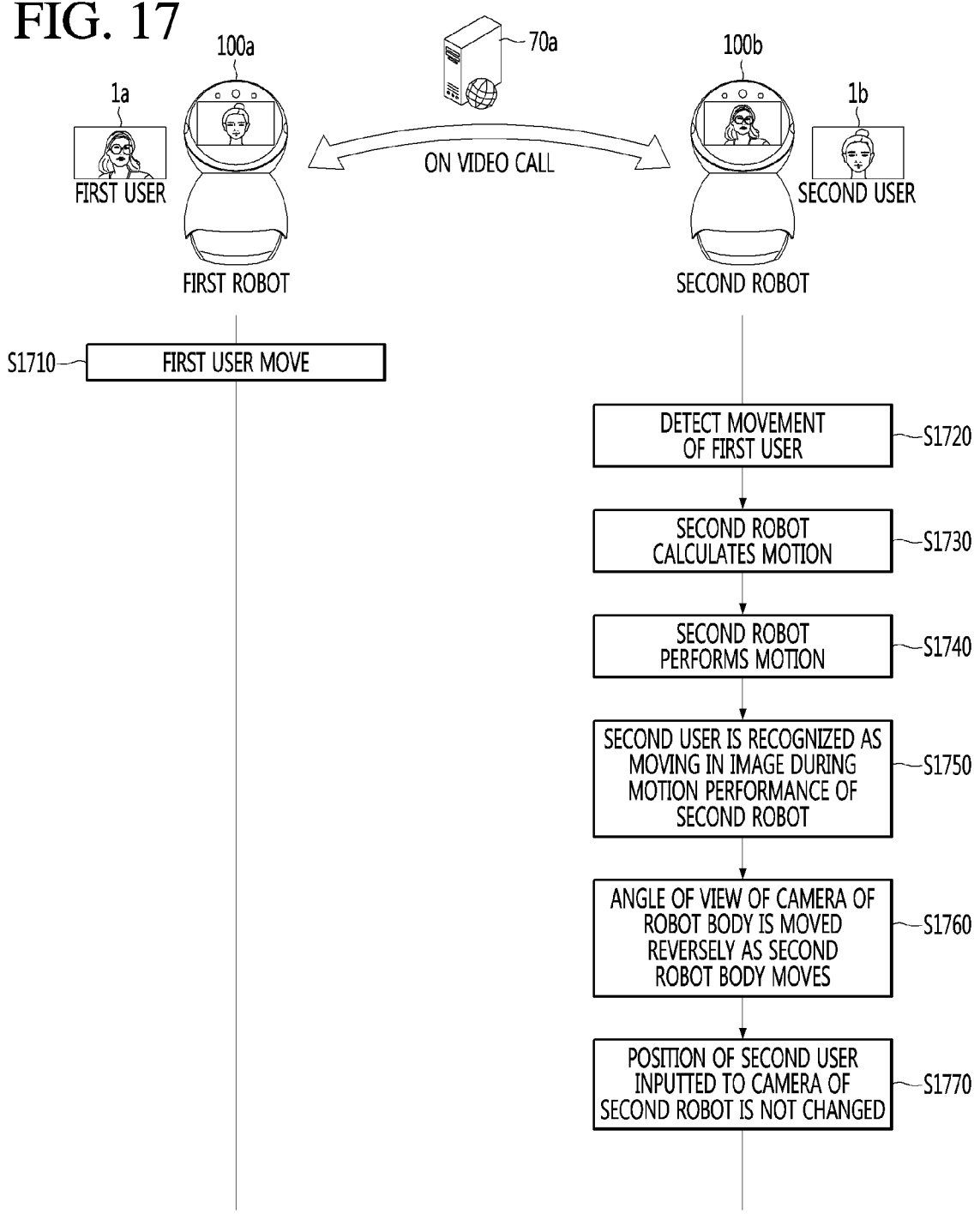
FIG. 17 is a flowchart illustrating a method of operating a robot and a robot system (including the robot) according to an embodiment of the present invention.

FIG. 17 is a flowchart illustrating a method of operating a robot and a robot system (including the robot) according to an example embodiment of the present invention. Other embodiments and operations may also be provided.

Referring to FIG. 17, the first user 1*a* and the second user 1*b* may use a video call service through the first robot 100*a* and the second robot 100*b*, respectively.

During the video call, the first robot 100*a* and the second robot 100*b* may transmit and receive video call data including image data and speech data. The first robot 100*a* and the second robot 100*b* may transmit/receive the video call data via the server 70*a* providing the video call service.

Referring to FIG. 17, if the first user moves (S1710), the image data transmitted by the first robot 100*a* to the second robot 100*b* may include a state in which the first user moves.

The second robot 100*b* may detect the movement of the first user 1*a* included in the image data received from the first robot 100*a* (S1720).

The second robot 100*b* may determine a first motion for responding to the detected movement of the first user 1*a* (S1730), and may perform the determined first motion (S1740)

If the first motion is performed without an operation for preventing misrecognition and malfunction, the second user 1*b* may be recognized as moving in the image acquired by the camera (S1750).

Accordingly, the second robot 100*b* may perform the determined first motion while varying the angle of view of the camera so as to cancel the detected movement of the first user 1*a* (S1740, S1760). Accordingly, during performance of the first motion (S1740), the camera may move so that the angle of view of the camera can vary (S1760).

The camera may move in a direction opposite to the detected movement of the first user 1*a* (S1760). Accordingly, the movement of the camera due to the movement of the first user 1*a* may be canceled, and the position of the second user 1*b* may be fixed within the image acquired by the camera (S1770).

Since the position of the second user 1*b* is fixed in the image acquired by the second robot 100*b*, the first robot 100*a* recognizing the image data received from the second robot 100*b* also recognizes that the second user 1*b* has not moved, and may not perform malfunction.

The robot 100 may determine a motion corresponding to the movement of the voice call counterpart by canceling the detected or received movement information of the user from the movement information of the voice call counterpart, as shown in FIGS. 12 to 17.

The operations (canceling operation and motion determining operation) may be performed in the server 70*a* providing the voice call service. Accordingly, detailed description related to operations of the robots 100*a* and 100*b* described in FIGS. 12 to 16 may be similarly applied to the server 70*a*.

Figure 18:
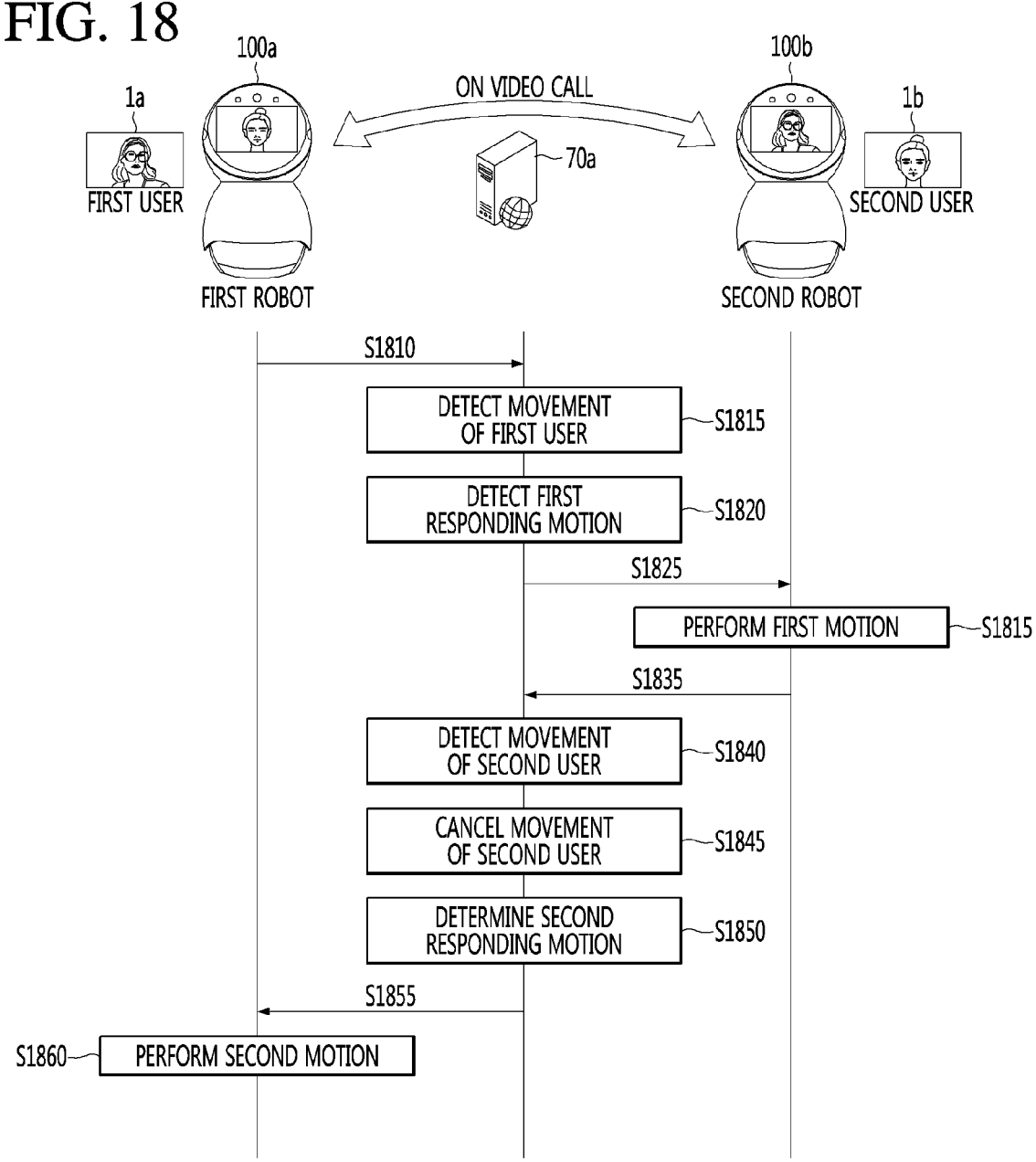
FIG. 18 is a flowchart illustrating an operation method of a robot and a server connected to the robot according to an embodiment of the present invention.

FIG. 18 is a flowchart illustrating an operation method of a robot and a server connected to the robot according to an example embodiment of the present invention. Other embodiments and operations may also be provided.

Referring to FIG. 18, a first robot 100a may transmit video call data (including image data) to a server 70a on video call (S1810).

The video call data may be data to be transmitted to a second robot 100b, which is a video call counterpart. The processor 71 of the server 70a may receive the video call data from the first robot 100a through the communication unit 72. The processor 71 may control the communication unit 72 to transmit the received video call data to the second robot 100b.

When the first user 1a moves, the image data received by the server 70a includes a state in which the first user 1a moves, and the processor 71 (of the server 70a) may detect the movement of the first user 1a from the received image data (S1815).

The server 70a may determine a first motion corresponding to the detected movement of the first user 1a (S1820), and may transmit motion data corresponding to the determined first motion to the second robot 100b (S1825).

The motion data may be transmitted to the second robot 100b together with the video call data. Alternatively, the motion data may be transmitted separately from the video call data.

According to an example embodiment, the processor 71 (of the server 70a) may further transmit timing information of the first motion to the second robot 100b.

The second robot 100b may perform the first motion based on the motion data received from the server 70a (S1830).

On the other hand, the second robot 100b may also transmit video call data including image data to the server 70a (S1835). The video call data may be data to be transmitted to the first robot 100a, which is a video call counterpart. The processor 71 (of the server 70a) may transmit the video call data to the first robot 100a.

The server 70a may detect the movement of the second user 1b from the image data received from the second robot 100b (S1840).

In order to prevent the movement of the second user 1b from being misrecognized due to performance of the first motion of the second robot 100b, the server 70a may cancel the detected movement information of the first user 1a according to S1815 from the detected movement information of the second user 1b (S1845). The server 70a may determine a second motion corresponding to the canceled movement information of the second user 1b (S1850).

Accordingly, the server 70a may cancel the movement information of the first user 1a from the detected movement information of the second user 1b, and may determine movement and the specific motion based on the canceled movement information of the second user 1b including the remaining movement component.

The server 70a may transmit motion data corresponding to the determined second motion to the first robot 100a (S1855), and the first robot 100a may perform the second motion based on the motion data received from the server 70a (S1860).

When performing a video call, the controller 140 (of the robot 100) should control the camera 120 and the speech input unit 125 to acquire video call data including image data and speech data. Additionally, the controller 140 should control the communication unit 190 to transmit the video call data to the video call counterpart robot through the server 70a. Additionally, the controller 140 should process the video call data transmitted from the video call counterpart robot through the communication unit 190 and output the processed video call data through the display 182 and the sound output unit 181.

The load of the controller 140 may increase during the video call, compared to other operations. At this time, when the robot 100 processes an operation of detecting a movement of a video call counterpart, an operation of canceling movement information, and an operation of determining a motion, the load of the controller 140 may be excessively increased so that a delay in processing speed or an increase in power consumption may occur.

Accordingly, as in the embodiment of FIG. 18, the operation of detecting the movement of the video call counterpart, canceling the movement information, and determining the motion are processed by the server 70a, so that excessive increase of the load of the robot 100 may be prevented or reduced.

Figure 19A:
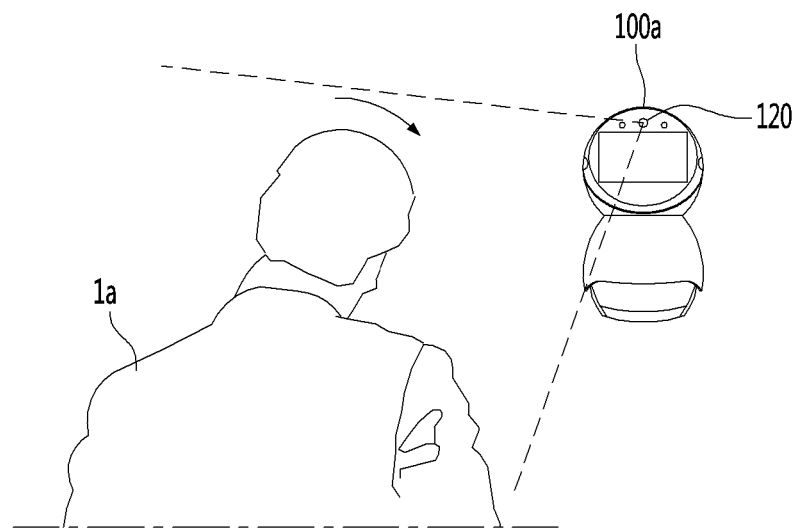
FIGS. 19A to 19C are diagrams illustrating an operation in which robots provide motion during video call according to the embodiments illustrated in FIGS. 12 to 18.
Figure 19B:
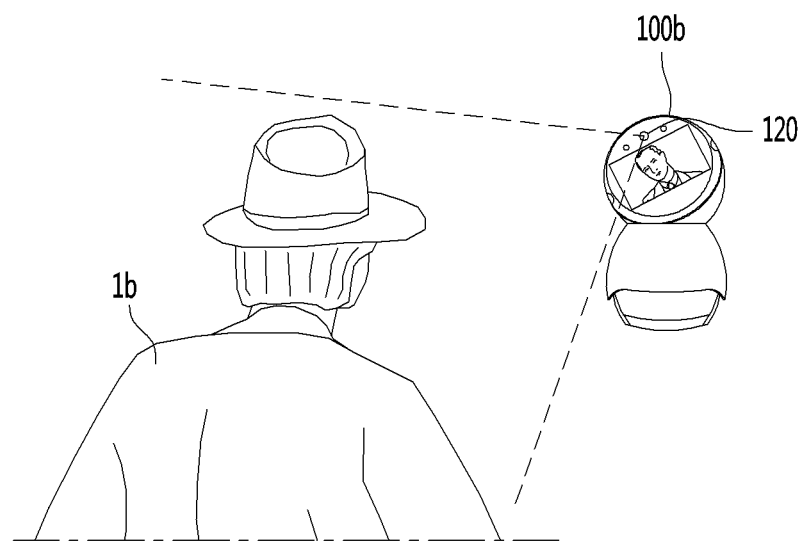
Figure 19C:
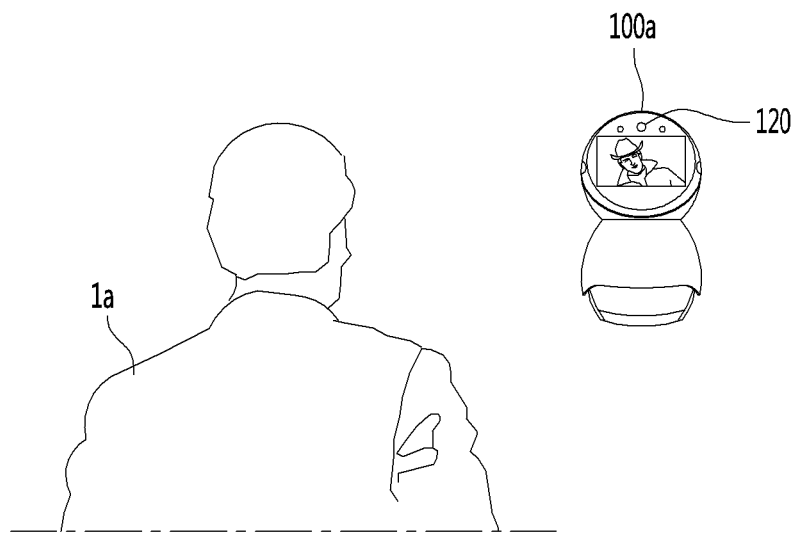

FIGS. 19A to 19C are diagrams illustrating an operation in which robots provide motion during a video call according to the embodiments shown in FIGS. 12 to 18. Other embodiments and configurations may also be provided.

Referring to FIGS. 19A to 19B, when the first user 1a tilts the face to the right, the second robot 100b which detects the movement of the first user 1a may perform a response motion tilting the head or the entire body to the right. If the second robot 100b can not reproduce the movement of the first user 1a, the second robot 100b may perform the alternative motion.

Even if the second user 1b has not move, the camera 120 may move as the second robot 100b performs a corresponding motion of tilting the head or the entire body to the right. Accordingly, the second user 1b may appear to tilt the face to the left in the image acquired by the camera 120.

Referring to FIG. 19C, even when the movement in which the second user 1b tilts the face to the left is detected in the image acquired by the second robot 100b, the first robot 100a or the server 70a may cancel the movement information of the first user 1a from the movement information of the second user 1b and may detect that the second user 1b has not moved. Accordingly, unlike FIG. 11C, the first robot 100a does not tilt the head or the entire body to the left, and thus malfunction may not occur. Meanwhile, in the image displayed on the display 182 of the first robot 100a, the second user 1b may be displayed as the face is tilted to the left.

According to example embodiments, the robot may reproduce the movement of the counterpart equally or similarly during a video call using the robot. Such a motion video call accompanied by the motion is that the user's robot follows the face motion of the counterpart.

However, as the user's robot rotates in response to the face motion of the counterpart, the camera mounted in the robot also rotates together with the robot body, and the counterpart may mistakenly recognize that the user's face is moved.

In order to prevent (or reduce) misrecognition and malfunction, and to achieve the operation of the robot that exactly corresponds with the movement of the user and the video call counterpart, a portion corresponding to the responding motion according to the movement of the video call counterpart may be cancelled.

Robots performing a video call may separately transmit movement information mutually, and the robot, which received the movement information, may compare the received movement information with detected movement information to make a difference so that the movement can be determined based on only the difference.

Alternatively, each robot may calculate and store the movement autonomously based on the face image of the sender/receiver, and may cancel the movement information included in the stored data from the detected movement information during the motion determination.

The robot equipped with a camera capable of moving can fix an object in the image by moving the camera in the direction opposite to the motion, thereby preventing misrecognition and malfunction in hardware.

According to at least one embodiment, the robot may recognize the movement of the video call counterpart and perform the response operation, and thus people can use the video call more amusingly and conveniently.

According to at least one embodiment, the emotion of the video call counterpart can be transmitted through the robot, and thus the satisfaction and convenience of the user can be enhanced.

According to at least one embodiment, a user emotion can be recognized and a service based on emotion can be provided.

According to at least one embodiment, the emotion of the user can be more accurately recognized by using the artificial intelligence learned by the deep learning.

According to at least one embodiment, the emotion of at least one of the video call participants can be recognized and the character can be generated according to the recognized emotion, so that the emotion of the participant of the video call can be intuitively checked.

The robot and the robot system are not limited to the configuration and the method of the embodiments described above but the embodiments may be modified so that all or some of the embodiments may be selectively combined.

The method of operating the robot and the robot system according to an embodiment of the present invention can be implemented as a code readable by a processor on a recording medium readable by the processor. The processor-readable recording medium includes all kinds of recording apparatuses in which data that can be read by the processor is stored. Examples of the recording medium that can be read by the processor include a ROM, a RAM, a CD-ROM, a magnetic tape, a floppy disk, an optical data storage apparatus, and the like, and may also be implemented in the form of a carrier wave such as transmission over the Internet. In addition, the processor-readable recording medium may be distributed over network-connected computer systems so that code readable by the processor in a distributed fashion can be stored and executed.

According to at least one embodiment, various fun elements can be provided during a video call.

According to at least one embodiment, a robot and an operation method thereof capable of recognizing the movement of at least one of the video call participants and operating according to the recognized movement can be provided.

According to at least one embodiment, misrecognition due to movement during video call can be prevented and the movement of a video call participant can be reflected.

User emotion can be recognized and a service based on emotion can be provided.

According to at least one embodiment, the emotion of the user can be more accurately recognized by using the artificial intelligence learned by the deep learning.

The present invention has been made in view of the above problems, and provides a robot that can offer various fun elements during a video call, and a method for operating the same.

The present invention may provide a robot that can recognize movement of at least one of video call participants, and can operate according to the recognized movement, and a method for operating the same.

The present invention may provide a robot that can prevent a false recognizing due to movement during a video call and reflect movement of a video call participant, and a method for operating the same.

The present invention may provide a robot that can recognize user emotion and can offer emotion-based services, and a method for operating the same.

The present invention may provide an emotion recognition method that can more accurately recognize a user's emotion by using artificial intelligence learned by deep learning.

The present invention may provide a robot that can transmit emotion of a video call counterpart, and a method for operating the same.

In accordance with an aspect of the present invention, a robot includes: a communication unit configured to transmit and receive data with a video call counterpart robot; a display configured to display a certain image based on the data received from the video call counterpart robot; a speech output unit configured to output a certain sound based on the data received from the video call counterpart robot; and a controller configured to detect movement of a video call counterpart using the video call counterpart robot included in image data received from the video call counterpart robot, cancel detected or received movement information of a user from detected movement information of the video call counterpart, and determine motion responding to the detected movement of the video call counterpart.

In accordance with another aspect of the present invention, a robot, a robot system, and a method for operating the robot can operate according to the movement of the video call participant by detecting the movement of the video call counterpart robot included in the image data received from the video call counterpart robot and performing a responding motion. When the first user uses the first robot and performs a video call with the second user using the second robot, the second robot detects the movement of the first user included in the image data received from the first robot and performs a responding motion, thereby operating according to the movement of the video call participant.

In accordance with another aspect of the present invention, a robot, a robot system, and a method for operating the robot detect movement of a video call counterpart using the video call counterpart robot included in image data received from the video call counterpart robot, cancel detected or received movement information of a user from detected movement information of the video call counterpart, and determine motion responding to the detected movement of the video call counterpart.

In this example, the first robot can cancel the movement information of the first user and perform the operation corresponding to the movement of the second user, thereby preventing misrecognition and malfunction and using a video call accompanied by motion.

In accordance with another aspect of the present invention, a robot, a robot system, and a method for operating the robot can detect the movement of the video call counterpart included in image data received from the video call counterpart robot, cancel the movement information of the user detected by the camera provided by the first robot and the second robot respectively or the movement information received from the video call counterpart robot, with respect to the detect movement of the video call counterpart, and then perform a motion corresponding to the movement of the video call counterpart, thereby preventing misrecognition and malfunction.

The second robot can transmit the detected movement information of the first user to the first robot, and, after the first robot cancels the movement information of the first user stored in the detected movement information of the second user, if there is no movement above the reference value, it can be determined that the second user is not moved.

Additionally, the first robot may transmit the movement information of the second user to the second robot after performing the motion.

The first robot may detect the movement of the first user inputted by the camera, and when the detected movement information of the second user is matched with the movement information of the first user, it is determined that the second user is not moved.

Additionally, when the first robot stores timing information about the detected movement of the first user, and the movement information and the timing information of the first and second users are matched, it is determined that the second user is not moved.

In accordance with another aspect of the present invention, a robot, a robot system, and a method for operating the robot can prevent an inefficient operation by determining that there is movement only when there is a movement greater than a certain reference value.

In accordance with another aspect of the present invention, a robot, a robot system, and a method for operating the robot can recognize the emotion of the video call participant, by transmitting data to the emotion recognition server that has been learned by a plurality of unimodal inputs and a multi-modal input based on the plurality of unimodal inputs, and receiving the emotion recognition result by the robot.

In accordance with another aspect of the present invention, a robot, a robot system, and a method for operating the robot can prevent misrecognition and malfunction, by performing motion while varying the angle of view of the camera so as to cancel the detected movement of the user. In this case, the camera can move in the opposite direction of the detected movement of the user.

Even in this example, a robot, a robot system, and a method for operating the robot according to another aspect of the present invention may prevent an inefficient operation, by determining that there is movement, only when there is a movement greater than a certain reference value.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of operating a robot, the method comprising:
receiving image data from a video call counterpart robot, the image data including information of a video call counterpart that uses the video call counterpart robot;
detecting movement of the video call counterpart based on the received image data;
removing, from the detected movement of the video call counterpart, information corresponding to movement of a user; and
determining motion of the robot corresponding to the detected movement of the video call counterpart having the removed information corresponding to movement of the user.

2. The method of claim 1, further comprising:
receiving, from the video call counterpart robot, the information corresponding to movement of the user detected by the video call counterpart robot; and
storing the received information corresponding to movement of the user.

3. The method of claim 2, wherein the determining the motion comprises determining that the video call counterpart has not moved, when there is no movement of the video call counterpart that is equal to or greater than a reference value, as a result of removing the information corresponding to movement of the user from the detected movement of the video call counterpart.

4. The method of claim 1, further comprising:
performing the determined motion of the robot; and
transmitting, to the video call counterpart robot, information on the detected movement of the video call counterpart.

5. The method of claim 1, further comprising:
detecting movement of the user by using a camera; and
storing information on the detected movement of the user.

6. The method of claim 5, wherein the determining the motion comprises determining that the video call counterpart has not moved, when the detected movement of the video call counterpart corresponds to the detected movement of the user.

7. The method of claim 5, further comprising:
storing timing information on the detected movement of the user.

8. The method of claim 7, wherein the determining the motion comprises determining that the video call counterpart has not moved, when the detected movement of the video call counterpart and timing information of the detected movement of the video call counterpart correspond to the detected movement of the user and the timing information of the detected movement of the user.

9. The method of claim 1, further comprising
displaying at least one of an image photographed by a camera or an image received from the video call counterpart robot.

10. The method of claim 1, further comprising:
transmitting image data and speech data received from the video call counterpart robot to an emotion recognition server learned by a plurality of unimodal inputs and a multi-modal input based on the plurality of unimodal inputs; and
receiving, from the emotion recognition server, an emotion recognition result of the video call counterpart for each of the plurality of unimodal inputs and an emotion recognition result of the video call counterpart for the multimodal input.

11. A robot comprising:
a communication device configured to transmit and receive data with a video call counterpart robot, the received data includes image data of a video call counterpart that uses the video call counterpart robot;
a display configured to display an image based on the received data; and
a controller configured to:
detect movement of the video call counterpart based on the received image data,
remove, from the detected movement of the video call counterpart, information corresponding to movement of a user, and
determine motion of the robot for responding to the detected movement of the video call counterpart having the removed information corresponding to movement of the user.

12. The robot of claim 11, wherein the controller determines that the video call counterpart has not moved, when there is no movement that is equal to or greater than a reference value, as a result of removing the information corresponding to movement of the user from the detected movement of the video call counterpart.

13. The robot of claim 11, further comprising a storage device configured to store the information corresponding to movement of the user and timing information based on movement of the user,
wherein the controller determines that the video call counterpart has not moved, when the detected movement of the video call counterpart and timing information of the detected movement of the video call counterpart correspond to the movement of the user and the timing information of the movement of the user.

14. The robot of claim 11, further comprising a driving device to control the robot to have the determined motion.

15. The robot of claim 11, wherein the controller controls the communication device to transmit the detected movement of the video call counterpart to the video call counterpart robot.

16. The robot of claim 11, wherein the controller detects movement of the user by using a camera, and determines that the video call counterpart has not moved, when the detected movement of the video call counterpart corresponds to the detected movement of the user.

17. A server comprising:
a communication device configured to wirelessly connect to a first robot and a second robot for a voice call; and
a processor configured to:
receive, through the communication device, first image data from the first robot,
detect movement of a first user of the first robot from the first image data,
determine a first motion corresponding to the detected movement of the first user,
control the communication device to transmit, to the second robot, first motion data corresponding to the determined first motion,
receive, through the communication device, second image data from the second robot,
determine a second motion corresponding to movement of a second user of the second robot based on the received second image data and the detected movement of the first user, and control the communication device to transmit, to the first robot, second motion data corresponding to the determined second motion.

18. The server of claim 17, wherein the processor is configured to:
   detect movement of the second user based on the received second image data,
   remove, from the detected movement of the second user, information corresponding to the detected movement of the first user, and
   determine the second motion based on the detected movement of the second user having the removed information corresponding to the detected movement of the first user.

19. The server of claim 18, wherein the processor is configured to:
   detect that there is no movement of the second user when the detected movement of the second user corresponds to movement less than a reference value.

20. The server of claim 17, wherein the second image data is image data obtained by the second robot while performing the first motion based on the first motion data.

* * * * *